US012798092B2

(12) United States Patent
Sano et al.

(10) Patent No.: US 12,798,092 B2
(45) Date of Patent: Nov. 17, 2026

(54) TEACHING DEVICE

(71) Applicant: Fanuc Corporation, Minamitsuru-gun (JP)

(72) Inventors: Shuya Sano, Minamitsuru-gun (JP); Shunta Ozaki, Minamitsuru-gun (JP); Gou Inaba, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 45 days.

(21) Appl. No.: 18/730,023

(22) PCT Filed: Jan. 27, 2022

(86) PCT No.: PCT/JP2022/003142
§ 371 (c)(1),
(2) Date: Jul. 18, 2024

(87) PCT Pub. No.: WO2023/144969
PCT Pub. Date: Aug. 3, 2023

(65) Prior Publication Data
US 2025/0100138 A1 Mar. 27, 2025

(51) Int. Cl.
*B25J 9/16* (2006.01)

(52) U.S. Cl.
CPC ... *B25J 9/1658* (2013.01); *G05B 2219/34256* (2013.01); *G05B 2219/39001* (2013.01)

(58) Field of Classification Search
CPC .................. B25J 9/1658; B25J 9/1656; G05B 2219/34256; G05B 2219/39001
See application file for complete search history.

(56) References Cited

U.S. PATENT DOCUMENTS

| | | | | |
|---|---|---|---|---|
| 2002/0196283 | A1* | 12/2002 | Petruk | G06F 8/34 715/763 |
| 2008/0009973 | A1* | 1/2008 | Matsuo | B25J 9/1671 700/245 |
| 2016/0314108 | A1* | 10/2016 | Mizuno | G06F 8/73 |
| 2020/0338736 | A1 | 10/2020 | Hoshiyama | |

(Continued)

FOREIGN PATENT DOCUMENTS

| | | |
|---|---|---|
| JP | H04100106 A | 4/1992 |
| JP | H08249026 A | 9/1996 |

(Continued)

OTHER PUBLICATIONS

Micro:bit Educational Foundation, Commenting your code in MakeCode, Jul. 22, 2021, Youtube, https://youtu.be/heDYTphbRE8?si=iXEq9388T6aDOPGz (Year: 2021).*

(Continued)

*Primary Examiner* — Jonathan L Sample
*Assistant Examiner* — Heather J Keniry
(74) *Attorney, Agent, or Firm* — BUCHANAN INGERSOLL & ROONEY PC

(57) ABSTRACT

A teaching device for an industrial machine includes a program creation unit that generates a program creation screen for creating a program for the industrial machine; a comment setting unit that accepts a setting for comments relating to instructions that make up the program; and a comment display switching unit that switches between display and non-display of a set comment on a display screen.

17 Claims, 24 Drawing Sheets

(56) References Cited

U.S. PATENT DOCUMENTS

| | | | | |
|---|---|---|---|---|
| 2023/0236804 A1* | 7/2023 | Jin | ............................ | G06F 9/451<br>717/109 |
| 2024/0300103 A1* | 9/2024 | Ozaki | .................... | B25J 9/1687 |

FOREIGN PATENT DOCUMENTS

| | | | |
|---|---|---|---|
| JP | 2002373007 | A | 12/2002 |
| JP | 2020182988 | A | 11/2020 |
| WO | 2021014517 | A1 | 1/2021 |
| WO | 2021215333 | A1 | 10/2021 |

OTHER PUBLICATIONS

International Search Report (PCT/ISA/210) with English translation and Written Opinion (PCT/ISA/237) mailed on Apr. 12, 2022, by the Japanese Patent Office as the International Searching Authority for International Application No. PCT/JP2022/003142, 9 pages.

* cited by examiner

Fig. 16

511

```
 1: ! START MOVEMENT OF WORKPIECE A
 2: !! CLOSE HAND
 3: RO [1] = OFF
 4: !! RISE
 5: EACH AXIS POSITION [1] 100% POSITIONING
 6: !! MOVE TO point A
 7: LINEAR POSITION [2] 250 mm/sec POSITIONING
 8: !! LOWER
 9: EACH AXIS POSITION [3] 50% POSITIONING
10: !! OPEN HAND
11: RO [1] = ON
12: !! WAIT
13: WAIT 1.0 SEC
14: ! END MOVEMENT OF WORKPIECE A
[END]
```

300A

Fig. 17

511

```
! START MOVEMENT OF WORKPIECE A
RO [1] = OFF
EACH AXIS POSITION [1] 100% POSITIONING
LINEAR POSITION [2] 250 mm/sec POSITIONING
EACH AXIS POSITION [3] 50% POSITIONING
RO [1] = ON
WAIT 1.0 SEC
! END MOVEMENT OF WORKPIECE A
[END]
```

300A

TEACHING DEVICE

CROSS REFERENCE TO RELATED APPLICATIONS

This is the U.S. National Phase application of PCT/JP2022/003142, filed Jan. 27, 2022, the disclosures of this application being incorporated herein by reference in its entirety for all purposes.

FIELD OF THE INVENTION

The present invention relates to a teaching device for teaching operation to an industrial machine.

BACKGROUND OF THE INVENTION

In general, it is difficult for a user to grasp the content of a robot program for controlling a robot, and thus annotations for facilitating understanding of the content of the robot program are included in the robot program. PTL 1 relates to a programming device that creates a program for a robot system by arranging graphical symbols in a sequence creation zone, and describes as follows: "Move the robot 1 to position [1] at 300 m/s. The motion format is "linear" and the smoothness of acceleration/deceleration control is 50%. Additionally, as additional information, it is noted that the direction of movement is vertical. Next, SDO [10] is outputted as ON. It is written as additional information that SDO [10] has the content of hand open." (FIG. 7, paragraph 0043).

PTL 2 describes a configuration example of a program editing screen for creating a machining program of a machine tool (FIG. 4, paragraphs 0095 to 0100).

PATENT LITERATURE

[PTL 1] Japanese Unexamined Patent Publication (Kokai) No. H08-249026 A

[PTL 2] PCT International Publication No. WO2021-014517 A1

SUMMARY OF THE INVENTION

Readability of a program for controlling an industrial machine can be improved by including annotations in a region where the program is displayed on a display screen of a teaching device. However, when the number of annotations included in a program for controlling an industrial machine increases, the display state of the program may become complex. Therefore, a teaching device having the function of allowing a user, who intends to use annotations when programming an industrial machine, to include annotations in a program in a more convenient form for a user is desired.

One aspect of the present disclosure is a teaching device of an industrial machine including: a program creation unit configured to generate a program creation screen for creating a program of the industrial machine; an annotation setting unit configured to receive an annotation related to a command constituting the program; and an annotation display switching unit configured to switch between display and non-display of the set annotation on a display screen.

The objects, the features, and the advantages, and other objects will become more apparent from the detailed description of typical embodiments of the present invention illustrated in accompanying drawings.

BRIEF DESCRIPTION OF DRAWINGS

FIG. 16 is a diagram illustrating a display state of a program and an annotation before execution of the program in the teaching device according to the sixth embodiment.

FIG. 17 is a diagram illustrating a display state of a program and an annotation during execution of the program in the teaching device according to the sixth embodiment.

DETAILED DESCRIPTION OF EMBODIMENTS OF THE INVENTION

Figure 1:
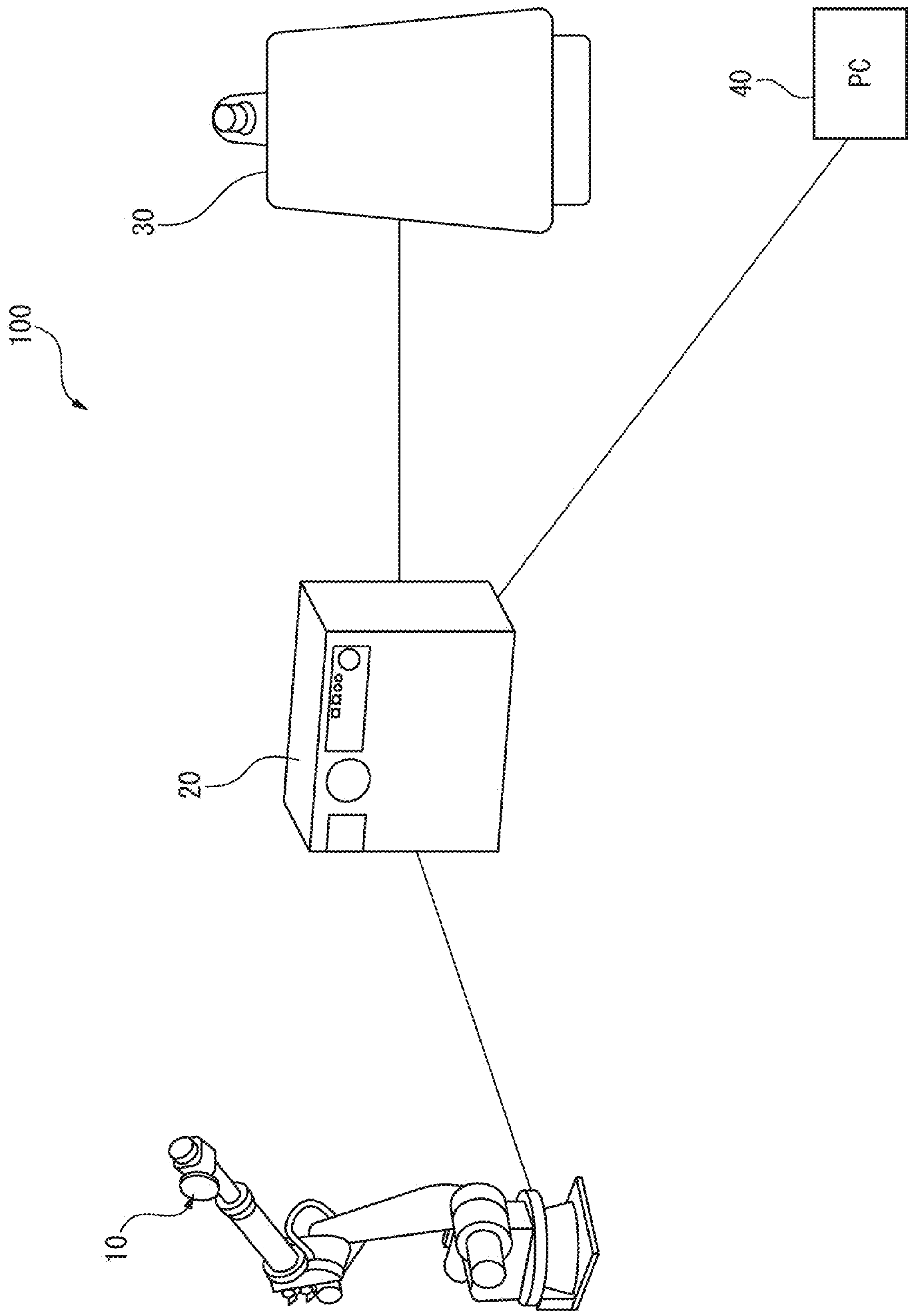
FIG. 1 is a diagram illustrating a configuration of a robot system including a teaching device according to one embodiment.

Next, embodiments of the present disclosure will be described with reference to drawings. The same configuration portion or the same functional portion is denoted by the same reference sign in the referred drawings. A scale is appropriately changed in the drawings in order to facilitate understanding. An aspect illustrated in the drawing is one example for implementing the present invention, and the present invention is not limited to the illustrated aspect.

Hereinafter, a teaching device according to a first embodiment to a ninth embodiment will be described. Since a configuration of a robot system including the teaching device is common in the first embodiment to the ninth embodiment, the configuration of the robot system common to each of the embodiments and a hardware configuration of each apparatus constituting the robot system will be first described with reference to FIGS. 1 and 2.

FIG. 1 is a diagram illustrating a configuration of a robot system 100 including a teaching device 30 according to an embodiment. As illustrated in FIG. 1, the robot system 100 includes a robot 10 as one example of an industrial machine, a robot controller 20 that controls the robot 10, and the teaching device 30 connected to the robot controller 20. In FIG. 1, the robot 10 is described as a vertical articulated robot, but a robot of another kind, for example, an orthogonal coordinate robot, a SCARA robot, a parallel link robot, and the like may be used as the robot 10. The teaching device 30 has various functions for teaching operation to (programming) the robot 10. Herein, the teaching device 30 is assumed to be a tablet device. Another type of an information processing device may be used as the teaching device 30. It should be noted that, as illustrated in FIG. 1, a personal computer (PC) 40 may be connected to the robot controller 20, and the PC 40 may be used as a teaching device (programming device).

The robot controller 20 controls motion of the robot 10 according to an instruction from the teaching device 30 or a motion program loaded in the robot controller 20. Various tools can be mounted as an end effector on an arm tip portion (flange portion) of the robot 10, and the robot 10 can be controlled to perform various pieces of work. For example, by installing a hand and a sensor (such as a visual sensor and a force sensor) on the arm tip portion, the robot 10 can be controlled to perform various pieces of work such as work for picking up a workpiece, palletizing, and precision fitting.

The teaching device 30 (or the PC 40) is configured to allow a user to carry out programming using a command icon (hereinafter also simply referred to as an icon) representing a function constituting a control program of the robot 10 (i.e., representing a command of robot control) in addition to programming on a text basis. Furthermore, the teaching device 30 provides a function of adding an annotation in a more convenient form for a user in programming of a robot. The PC 40 is configured to have the same function as that of the teaching device 30 in regard to teaching of the robot 10.

Figure 2:
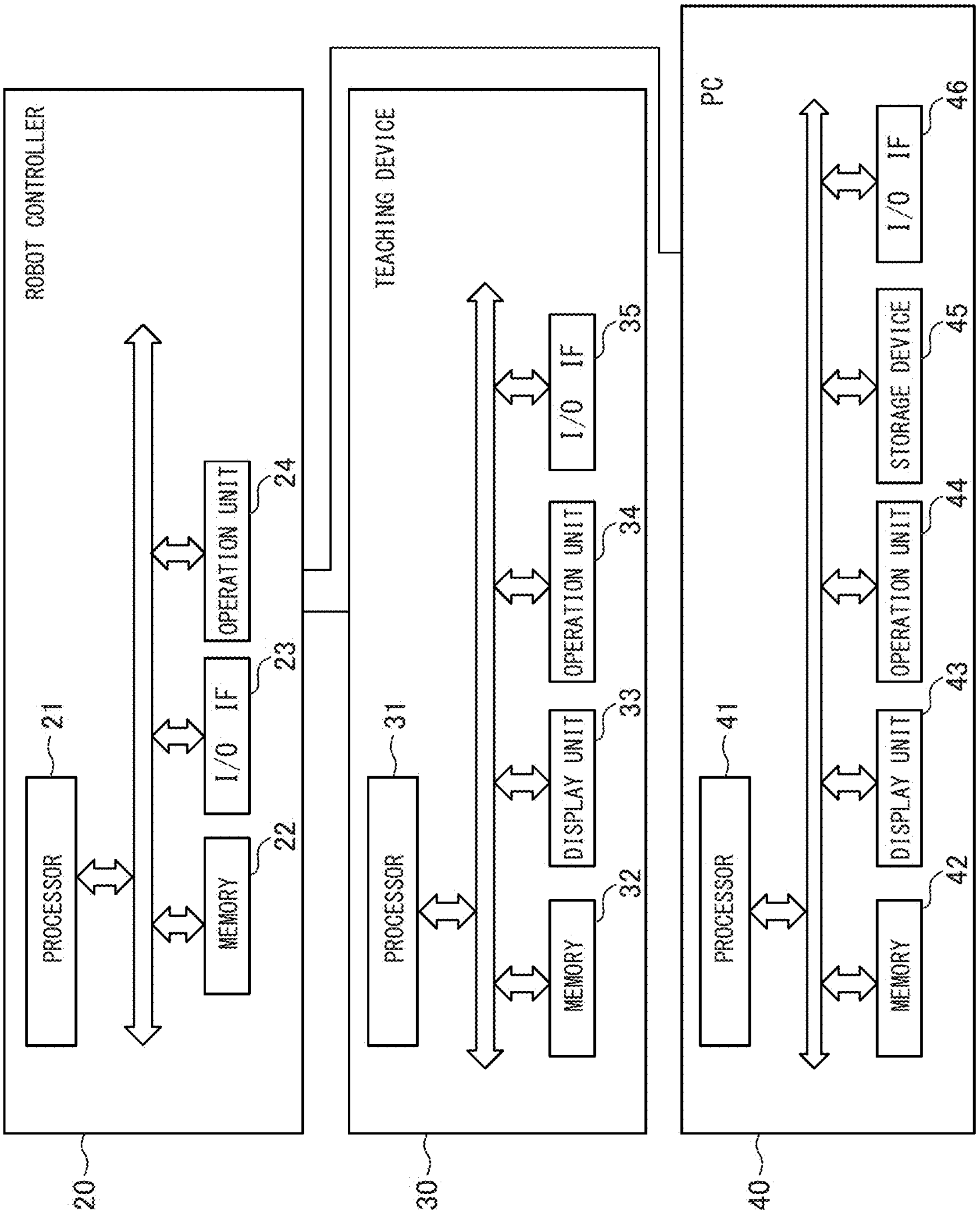
FIG. 2 is a diagram illustrating a hardware configuration example of a robot controller, a teaching device, and a PC.

FIG. 2 illustrates a hardware configuration example of the robot controller 20, the teaching device 30, and the PC 40. The robot controller 20 may have a configuration as a general computer in which a memory 22 (such as a ROM, a RAM, and a non-volatile memory), various input/output interfaces 23, an operation unit 24 including various operation switches, and the like are connected to a processor 21 via a bus. The teaching device 30 may have a configuration as a general computer in which a memory 32 (such as a ROM, a RAM, and a non-volatile memory), a display unit 33, an operation unit 34 formed of an input device such as a keyboard (or a software key), various input/output interfaces 35, and the like are connected to a processor 31 via a bus. The PC 40 has a hardware configuration of a general purpose computer in which a memory 42 (such as a ROM, a RAM, and a non-volatile memory), a display unit 43, an operation unit 44 formed of an input device such as a keyboard and a mouse, a storage device (such as an HDD) 45, various input/output interfaces 46, and the like are connected to a processor 41.

Hereinafter, the teaching device 30 according to the first embodiment to the ninth embodiment will be described. The first embodiment to the fifth embodiment and the seventh embodiment to the ninth embodiment relate to a function for carrying out programming by an icon among functions of the teaching device 30. The sixth embodiment relates to a function for carrying out programming on a text basis among the functions of the teaching device 30. The teaching devices according to the first embodiment to the sixth embodiment are provided with reference signs 30A, 30B, 30C, 30D, 30E, and 30F, respectively.

First Embodiment

Figure 3:
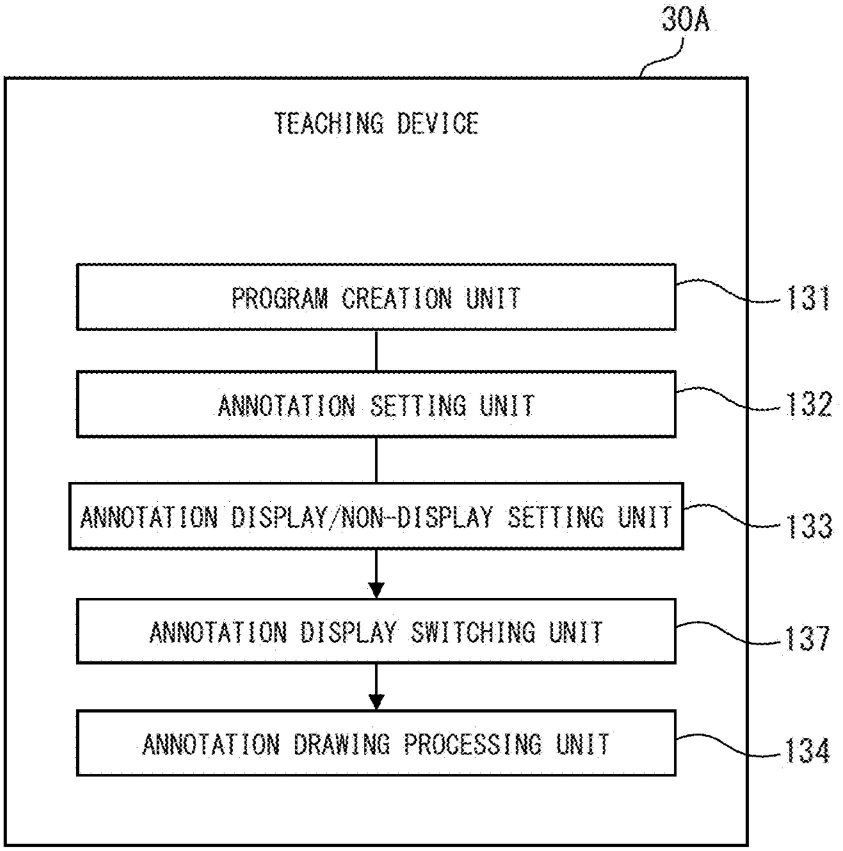
FIG. 3 is a functional block diagram of the teaching device according to a first embodiment.

FIG. 3 is a functional block diagram illustrating a functional configuration of the teaching device 30A according to the first embodiment. The functional configuration illustrated in the functional block diagram may be achieved by executing various types of software stored in the memory 32 by the processor 31 of the teaching device 30A, or may be achieved by a configuration in which hardware such as an application specific integrated circuit (ASIC) is a main body. The same applies to functional block diagrams according to the other embodiments indicated below.

As illustrated in FIG. 3, the teaching device 30A includes a program creation unit 131 that provides various basic functions for carrying out programming on a text basis or an icon basis. The program creation unit 131 has functions of providing a program creation screen, a setting screen for carrying out detailed parameter setting (teaching), and other various user interface (UI) screens, and also supporting a user operation (such as selection and an arrangement of a command sentence or a command icon) via the various UI screens.

The teaching device 30A further includes an annotation setting unit 132, an annotation display/non-display setting unit 133, an annotation display switching unit 137, and an annotation drawing processing unit 134.

The annotation setting unit 132 receives a setting input of an annotation for an icon arranged in a region (hereinafter, the region is also referred to as a program display region) for creating and displaying a program by arranging a command (such as an icon and a command sentence) on a program creation screen.

The annotation display/non-display setting unit 133 provides a function of receiving an operation input for switching whether to display an annotation set by the annotation setting unit 132 on a display screen of the display unit 33, or a setting input for setting, for each icon, whether to display an annotation.

The annotation display switching unit 137 provides a function of switching between display and non-display of an annotation according to the operation input or the setting input received by the annotation display/non-display setting unit 133.

The annotation drawing processing unit 134 draws or deletes an annotation set by the annotation setting unit 132 on or from the display screen according to an instruction on whether to display the annotation from the annotation display switching unit 137.

Figure 4:
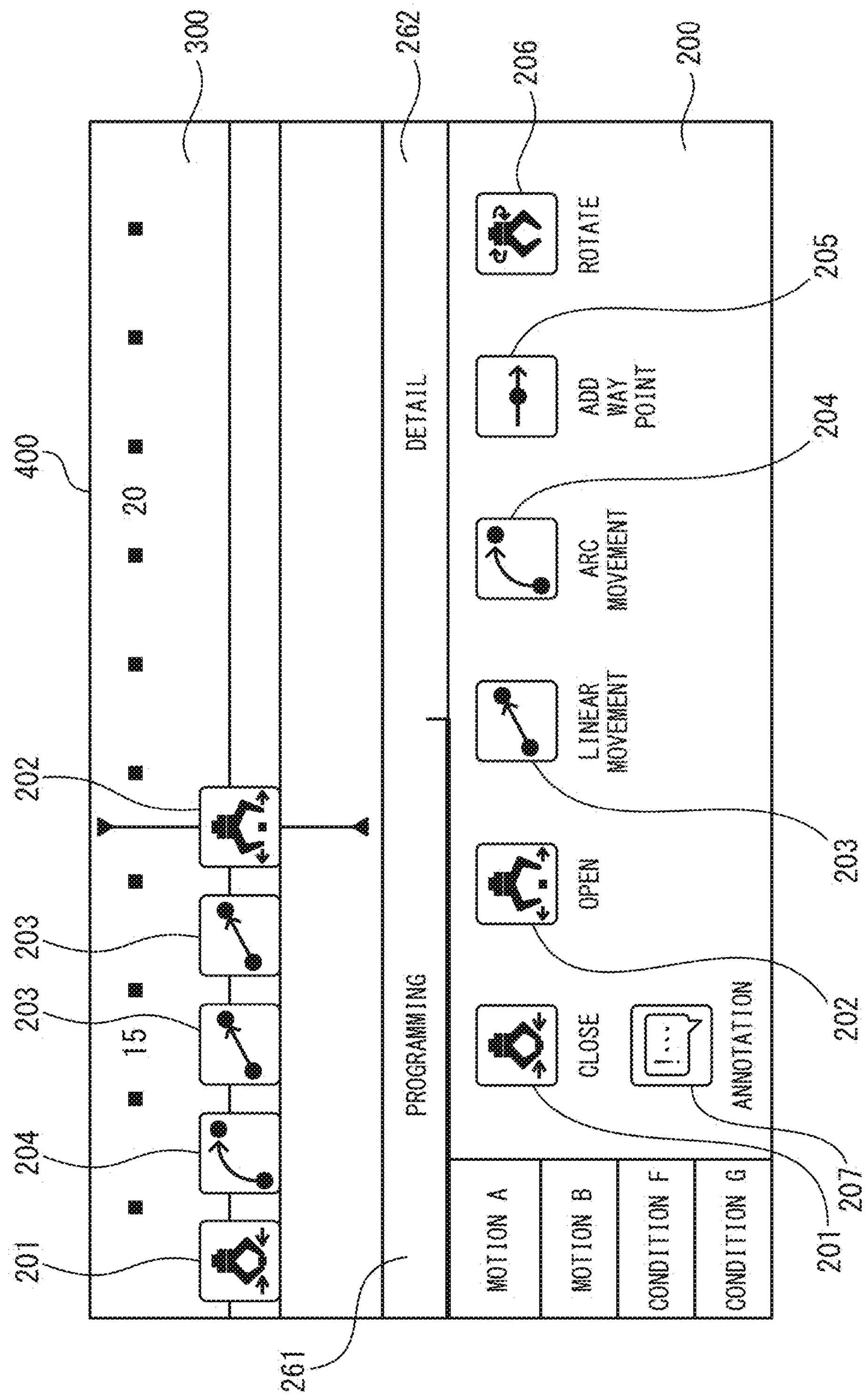
FIG. 4 is a diagram illustrating a basic configuration example of a program creation screen.

FIG. 4 illustrates an example of a basic configuration of a program creation screen 400 created by the program creation unit 131 and displayed on the display unit 33. It should be noted that the basic configuration of the program creation screen 400 by the program creation unit 131 is assumed to be similar to that in the second embodiment to the fifth embodiment and the seventh embodiment to the ninth embodiment described below.

As illustrated in FIG. 4, the program creation screen 400 includes an icon display region 200 for displaying a list of various icons that can be used for programming, and a program display region 300 for creating a program by arranging the icons in order. In the example in FIG. 4, the icon display region 200 includes a hand close icon 201 representing a command for closing a hand, a hand open icon 202 representing a command for opening the hand, a linear movement icon 203, an arc movement icon 204, a way point addition icon 205, a rotation icon 206 representing a command for rotating the hand, and an annotation command icon 207 for setting and displaying an annotation.

In the program creation screen 400, the user selects a programming tab 261 when the user carries out programming. The user carries out programming by selecting a desired icon from the icon display region 200 and arranging the icon in the program display region 300 by, for example, a drag-and-drop operation. In the example in FIG. 4, in the program display region 300, the hand close icon 201, the arc movement icon 204, two linear movement icons 203, and the hand open icon 202 are arranged in order. When the number of icons arranged in the program display region 300 increases, the user can additionally arrange an icon by scrolling the screen in a horizontal direction.

On the other hand, by selecting an icon in the program display region 300 by, for example, putting a cursor on the icon, and selecting a detail tab 262, the user can open a setting screen for carrying out detailed setting on the icon. Alternatively, when an icon is selected in the program display region 300, a setting screen of the icon may be activated.

The user can execute a program by carrying out a predetermined operation while icons are arranged in the program display region 300. A program constituted by icons arranged in the program display region 300 can be entirely collectively executed, or a program can be stopped halfway. Alternatively, a program can be executed step by step for each command icon. Execution in a step-by-step manner is effective when a program is checked while a content of the program created by the user and motion of a robot are compared on a one-by-one basis.

A switching function between display and non-display of an annotation by the teaching device 30A will be described with reference to FIG. 5. The teaching device 30A provides a function of switching between display and non-display of an annotation according to a predetermined operation and setting by the user.

Figure 5:
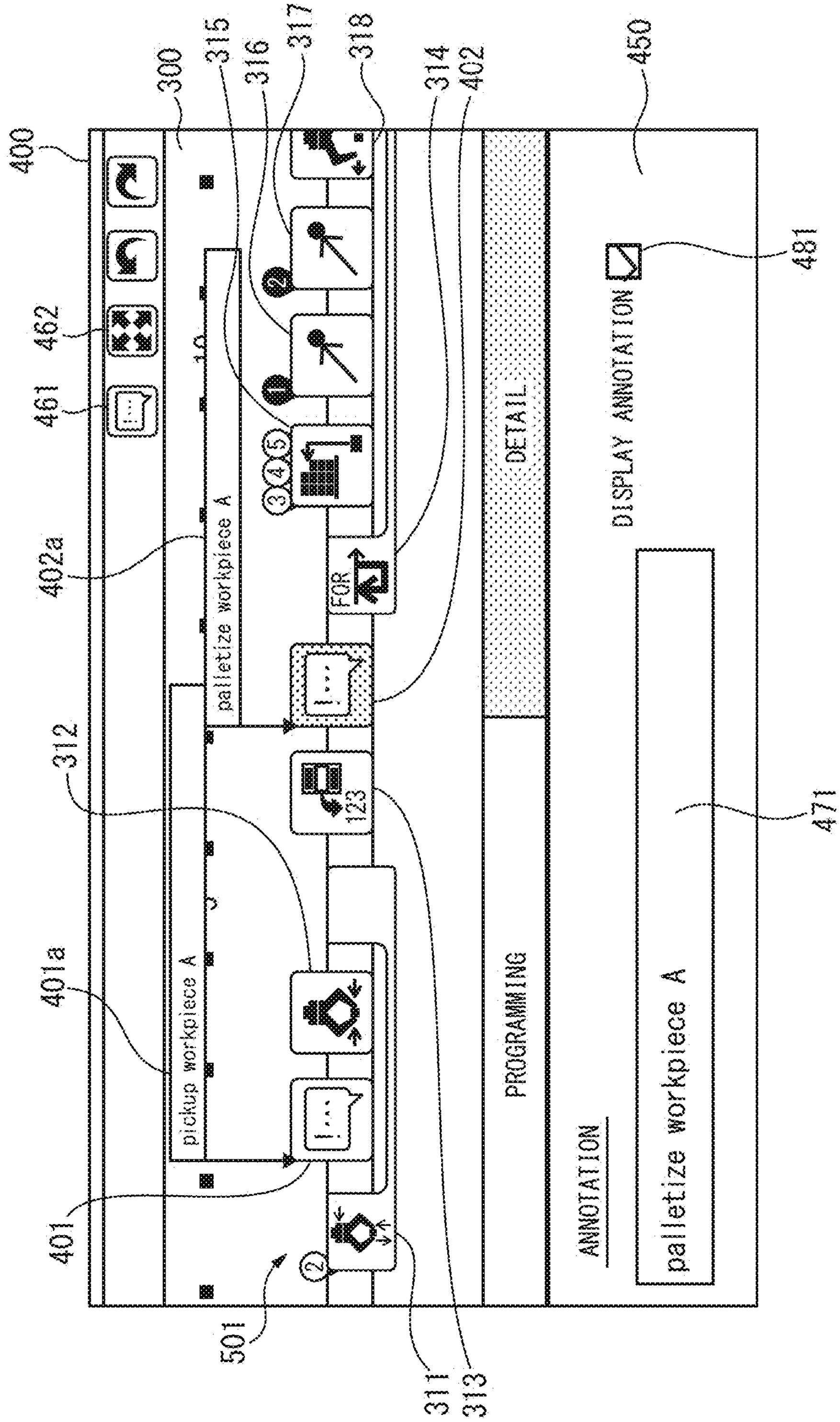
FIG. 5 is a diagram illustrating a switching function between display and non-display of an annotation by the teaching device according to the first embodiment.

FIG. 5 illustrates a state where the user creates a program 501 by arranging icons in the program display region 300. FIG. 5 is assumed to be in a state during creation (before execution) of the program 501. In the program display region 300, the following icons among icons constituting the program 501 are displayed.

A wide pickup icon 311 that instructs pickup of a workpiece
An annotation command icon 401
A hand close icon 312 for closing a hand and holding a workpiece
A resistor icon 313 for specifying a value to a register
An annotation command icon 402
A wide FOR loop icon 314 for specifying FOR loop processing
A palletizing icon 315
Linear movement icons 316 and 317
A hand open icon 318

The wide pickup icon 311 includes, as detailed setting, a stand-by position for approaching a target object, a holding position at which the target object is approached and held, and the like, and achieves motion for picking up a workpiece by the pickup icon 311 and an icon (herein, the hand close icon 312) included in a range of the pickup icon 311. It should be noted that the annotation command icon 401 is also included in the range of the pickup icon 311, and the annotation command icon 401 is also executed and an annotation is displayed in response to execution of the pickup icon 311. The wide FOR loop icon 314 includes, as detailed setting, a condition for executing each command in the FOR loop icon 314, and achieves a function of palletizing a workpiece by the FOR loop icon 314 and each icon arranged in a range of the FOR loop icon 314.

In the program display region 300, a portion of the entire program 501 that can be displayed in the program display region 300 is displayed. The user can horizontally scroll display of the program display region 300 by carrying out a predetermined operation, and display the other portion of the program 501. When the program 501 is executed, icons arranged in the program display region 300 may be horizontally scrolled so that, for example, a command (icon) being currently executed is located at the center of the program display region 300.

The user inserts the annotation command icon 401 between the pickup icon 311 and the hand close icon 312 in order to provide an annotation to a portion related to the workpiece pickup motion attained by the pickup icon 311 and the hand close icon 312. The annotation command icon provides a function of displaying, in a position where the annotation command icon is arranged or in the vicinity of the position, an annotation set for the annotation command icon. When setting for the annotation command icon is carried out, a setting screen 450 for carrying out detailed setting can be activated below the program display region 300 by carrying out an operation of selecting the annotation command icon (moving the cursor to the annotation command icon, clicking the annotation command icon, and the like).

"Pickup workpiece A" is specified as an annotation sentence for the annotation command icon 401. In the program display region 300, the annotation "pickup workpiece A" (annotation 401*a*) set for the annotation command icon 401 is displayed in a flag form. By viewing the annotation "pickup workpiece A", the user can immediately recognize a motion attained by a command (pickup icon 311) located in a position where the annotation command icon 401 is disposed.

In the program display region 300 in FIG. 5, the annotation command icon 402 is arranged before the FOR loop icon 314. FIG. 5 illustrates a state where the setting screen 450 of the annotation command icon 402 is displayed in a lower portion of the program creation screen 400 as a result of selecting the annotation command icon 402 in order to carry out setting of an annotation and the like on the annotation command icon 402. By inputting an annotation to an annotation input field 471 of the setting screen 450, the user can specify the annotation to be displayed in the program display region 300.

In the setting screen 450 of the annotation command icon 402, "palletize workpiece A" is set as an annotation sentence by the user in the annotation input field 471. As described above, setting of an annotation on the setting screen 450 is provided as a function of the annotation setting unit 132. In this way, the annotation sentence "palletize workpiece A" (annotation 402*a*) set in the annotation input field 471 is displayed in the program display region 300. Such a display of an annotation is performed by drawing of the annotation by the annotation drawing processing unit 134 under an instruction to display the annotation from the annotation display switching unit 137.

In this way, in the present embodiment, the annotation drawing processing unit 134 displays an annotation set for an annotation command icon in a style that the annotation is recognizably associated with the icon and that the annotation is contained in the program display region 300. It should be noted that FIG. 5 illustrates display of an annotation in a flag form as an example of such a display of an annotation, but the other display style for displaying an annotation such as a balloon form may be used. Note that, when display of an annotation is permitted, the annotation drawing processing unit 134 may operate to draw an annotation on a condition that the annotation command icons 401 and 402 are located in (scrolled in) the program display region 300, and to delete an annotation on a condition that the annotation command icons 401 and 402 are located outside (scrolled out of) the program display region 300.

As illustrated in FIG. 5, an annotation display switching button 461 for switching between display and non-display of an annotation and an enlarged display button 462 for performing enlarged display are disposed on a right side of an upper portion of the program creation screen 400.

The annotation display switching button 461 provides a function of collectively switching an annotation set for each annotation command icon to display or non-display. FIG. 5 illustrates a case where the annotation display switching button 461 is set to a state where an annotation can be displayed. Therefore, the annotations 401*a* and 402*a* set for the annotation command icons 401 and 402 can be displayed. The annotations 401*a* and 402*a* are brought from the state of the annotation display in FIG. 5 into a non-display state (see FIG. 8B) by operating the annotation display switching button 461. In this way, in the present example, the annotation display switching button 461 provides the function of switching between display and non-display of an annotation every time the annotation display switching button 461 is pressed. In order to easily recognize whether an annotation can be displayed or not displayed, a display style of the annotation display switching button 461 may be changed (a color may be changed, the button may be highlighted in an annotation display state, or the like) according to a displayable state/non-displayable state of the annotation. Switching between display and non-display of an annotation by operating such an annotation display switching button 461 is attained by receiving an operation input by the annotation display/non-display setting unit 133 and instructing the annotation display switching unit 137 to operate according to a content of the operation input.

As illustrated in FIG. 5, a check box 481 for setting whether to permit display of an annotation may be provided in the setting screen 450 of an annotation command icon. When the check box 481 is checked, display of the annotation of the annotation command icon in the program display region 300 is permitted. On the other hand, when the check box 481 is not checked, display of the annotation in the program display region 300 is not permitted even when the annotation is set in the annotation input field 471. The switching function between display and non-display of an annotation by the check box 481 results in an advantage that display and non-display of an annotation can be set for each annotation command icon. Switching between display and non-display of an annotation for each icon by setting of such a check box 481 is attained by receiving a setting input by the annotation display/non-display setting unit 133 and instructing the annotation display switching unit 137 to operate according to a content of the setting input.

It should be noted that, in a configuration in which the check box 481 is provided in a setting screen of each annotation command icon, the annotation display switching button 461 may be omitted or the annotation display switching button 461 may be provided. In a configuration in which both of the annotation display switching button 461 and the check box 481 are provided in a setting screen of each annotation command icon, for example, display and non-display of an annotation may be switched depending on a state of the check box 481 when annotation display is permitted by the annotation display switching button 461, and an annotation may not be displayed regardless of a state of the check box 481 when annotation display is not permitted by the annotation display switching button 461.

In this way, the user can display an annotation set by the user in a desired position in the program display region 300 by arranging an annotation command icon in a desired position in the program display region 300. Further, at the same time, the user can set non-display of an annotation in a situation where annotation display is not desired, for example, when the program 501 is executed and the like.

Figure 6:
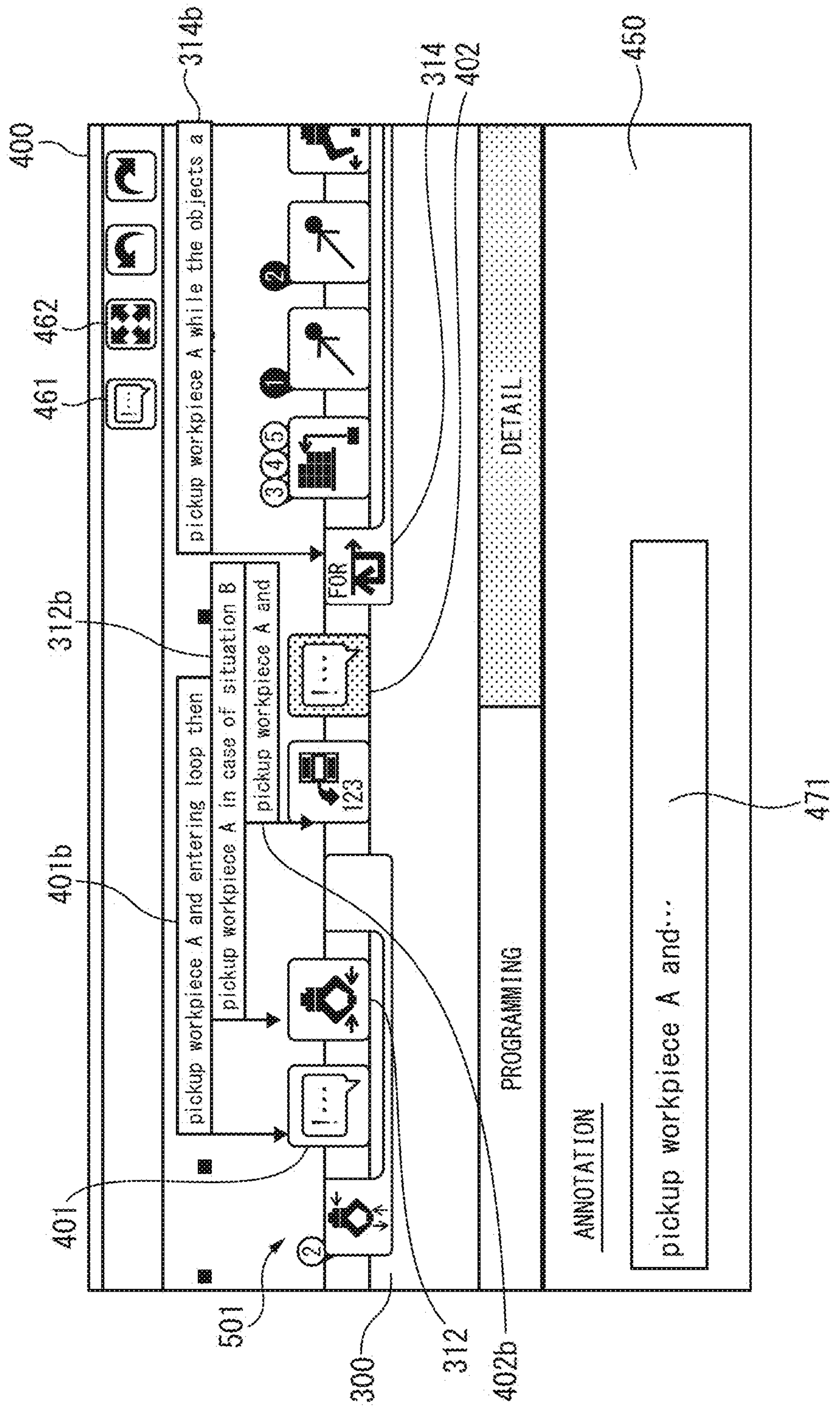
FIG. 6 is a diagram illustrating a display state when the number of annotations is great as a reference example.

FIG. 6 illustrates, as a reference example, a display example of an annotation in the program display region 300 when an annotation is long and the number of annotations is great. FIG. 6 illustrates a state where annotations 401*b*, 312*b*, 402*b*, and 314*b* respectively set for the annotation command icon 401, the hand close icon 312, the annotation command icon 402, and the FOR loop icon 314 are displayed in the program display region 300.

As in FIG. 6, when the number of annotations is great and an annotation is long, the entire annotation sentence may not be able to be displayed in a desired position. In this point, according to the present embodiment, the function of switching between display and non-display of an annotation collectively or for each individual icon is provided, and thus it is understood that a user may adjust display of an annotation to an appropriate state.

Second Embodiment

Figure 7:
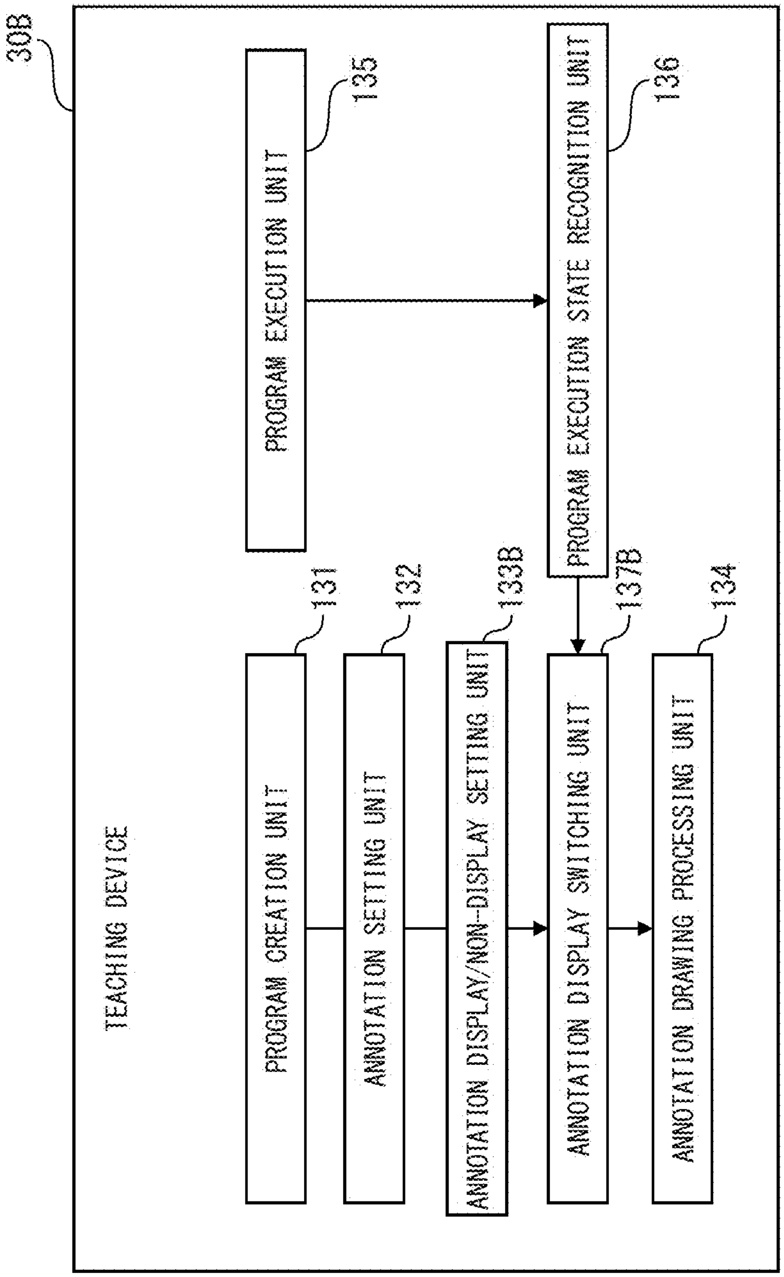
FIG. 7 is a functional block diagram of a teaching device according to a second embodiment.

Hereinafter, the teaching device 30B according to the second embodiment will be described. FIG. 7 is a functional block diagram of the teaching device 30B. The teaching device 30B includes a program creation unit 131, an annotation setting unit 132, an annotation display/non-display setting unit 133B, an annotation drawing processing unit 134, a program execution unit 135, a program execution state recognition unit 136, and an annotation display switching unit 137B. Among the functions of the teaching device 30B, the functions of the program creation unit 131, the annotation setting unit 132, and the annotation drawing processing unit 134 are substantially the same as those of the teaching device 30A according to the first embodiment.

The teaching device 30B according to the second embodiment provides functions as follows in regard to display and non-display of an annotation.

(F21) A basic operation is to display an annotation before program execution (during a stop) and not display an annotation during program execution.

(F22) However, setting can be accepted for each icon (each annotation command icon) in such a way as to permit display of an annotation at the time of execution of a program.

The annotation display/non-display setting unit 133B provides, to the annotation display switching unit 137B, information about setting as to whether to permit display of each annotation command icon at the time of execution of a program.

The program execution unit 135 provides a function of executing or stopping a program created on the program display region 300 in response to a user operation by cooperating with a robot controller 20.

The program execution state recognition unit 136 recognizes whether a program is being executed by receiving information about an execution state of the program from the program execution unit 135, and provides information indicating whether the program is being executed to the annotation display switching unit 137B.

The annotation display switching unit 137B instructs the annotation drawing processing unit 134 to switch between display and non-display of an annotation, based on information, which is provided from the annotation display/non-display setting unit 133B, about setting as to whether to permit display of the annotation during program execution, and information, which is provided from the program execution state recognition unit 136, indicating whether the program is being executed.

The annotation drawing processing unit 134 draws or deletes an annotation set by the annotation setting unit 132 on or from the display screen according to an instruction on switching setting between display and non-display of the annotation by the annotation display switching unit 137B.

Hereinafter, a switching function between display and non-display of an annotation by the teaching device 30B according to the second embodiment will be described with reference to FIGS. 8A and 8B. A program (command icon) arranged in a program display region 300, an arrangement of annotation command icons 401 and 402, and annotations set for the annotation command icons 401 and 402 are assumed to be the same as those in the first embodiment. It should be noted that FIGS. 8A and 8B illustrate an example in which the teaching device 30B operates according to the basic function (F21) described above.

In each of the annotation command icons 401 and 402, it is assumed that a check box 472 that permits display of an annotation during program execution is not checked by default (display of an annotation during program execution is set to be not permitted). The annotation display/non-display setting unit 133B provides the setting information about each annotation command icon to the annotation display switching unit 137B. In this case, the annotation display switching unit 137B operates to switch between display and non-display of an annotation according to information, which is provided from the program execution state recognition unit 136, about whether a program is being executed.

Figure 8A:
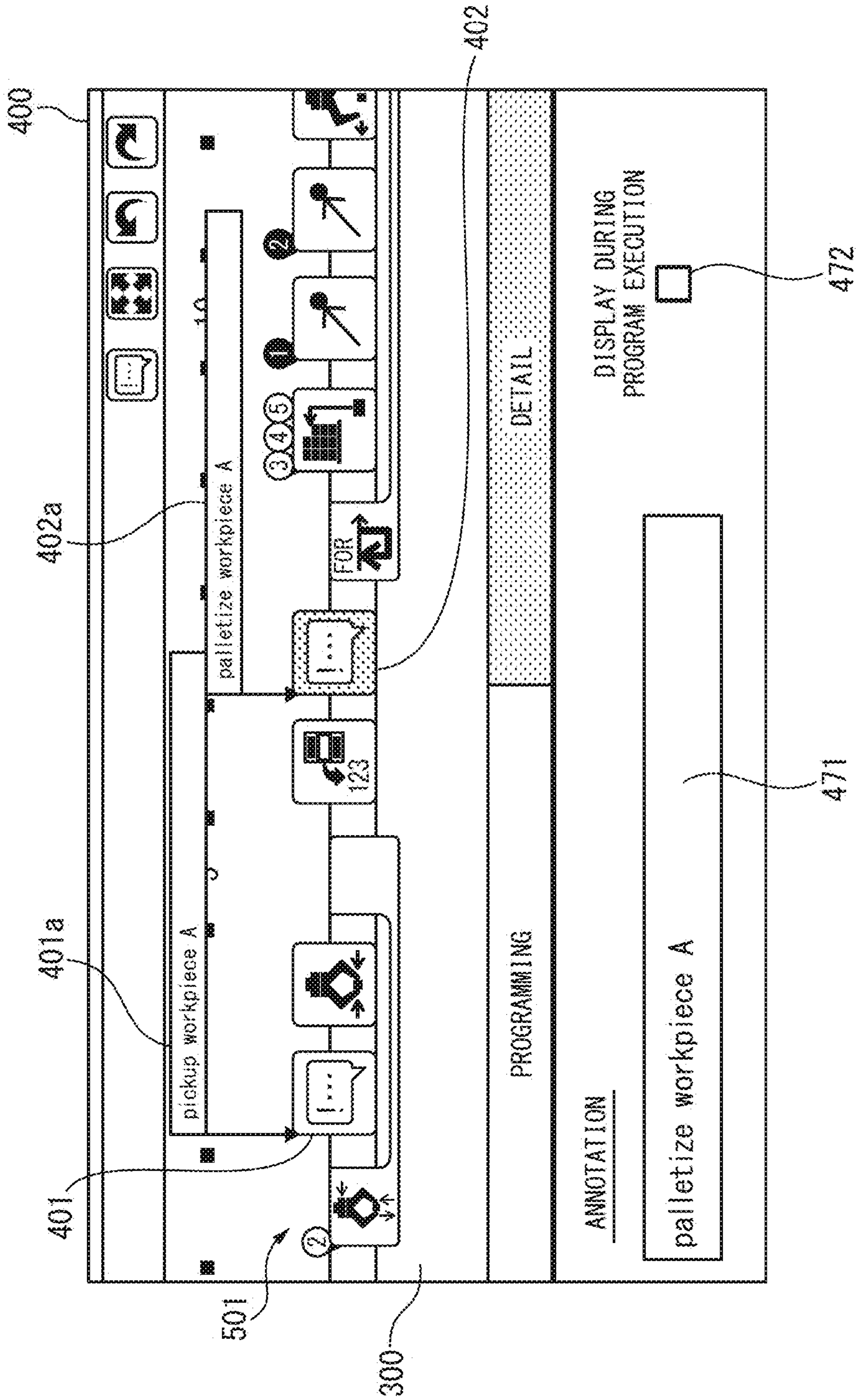
FIG. 8A is a diagram illustrating a switching function between display and non-display of an annotation by the teaching device according to the second embodiment.

FIG. 8A illustrates a display state before execution of a program 501. In this case, as illustrated in FIG. 8A, in the state before execution of the program 501, annotations 401*a* ("pickup workpiece A") and 402*a* ("palletize workpiece A") set for the annotation command icon 401 and the annotation command icon 402 are displayed in the program display region 300.

Figure 8B:
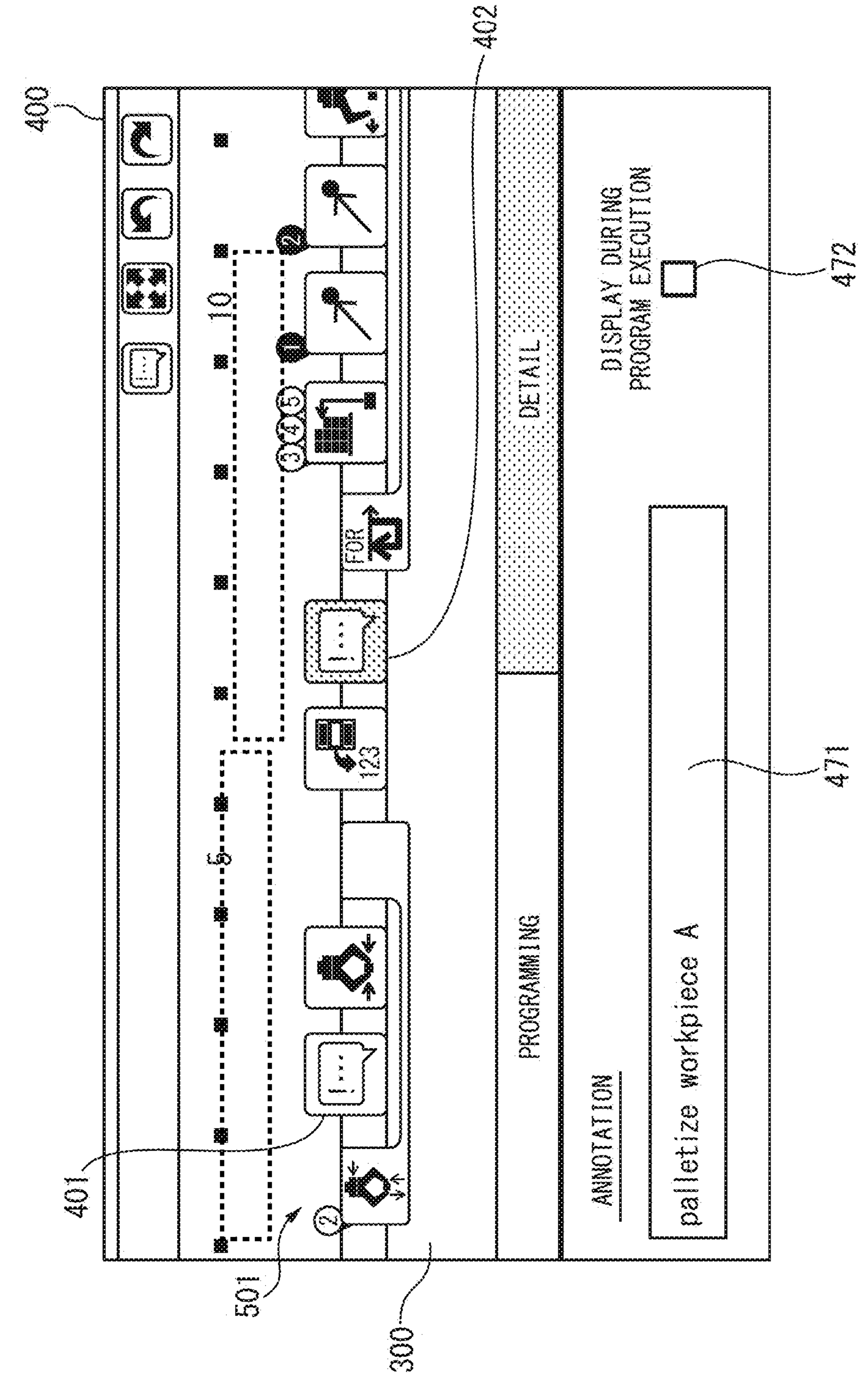
FIG. 8B is a diagram illustrating a switching function between display and non-display of an annotation by the teaching device according to the second embodiment.

On the other hand, FIG. 8B illustrates a display style during execution of the program 501. In this case, information indicating that the program is being executed is provided from the program execution state recognition unit 136 to the annotation display switching unit 137B, and the annotation display switching unit 137B instructs the annotation drawing processing unit 134 to set the annotations 401*a* and 402*a* to be in a non-display state. Then, the annotation drawing processing unit 134 deletes the annotations 401*a* and 402*a*. It should be noted that, in FIG. 8B, in order to describe that the annotations 401*a* and 402*a* are deleted at the time of program execution, boxes by broken lines are provided in positions where the annotations 401*a* and 402*a* had been arranged for convenience'sake.

In this way, in the second embodiment, the teaching device can operate according to the basic operation for setting non-display of an annotation during program execution. While a user who creates a program improves readability of the program by displaying an annotation during creation of the program, the user often pays close attention to the type of a command being currently executed and the types of commands arranged around the command being currently executed during execution of the program, and also pays close attention to how a robot is actually performing motion. Therefore, the operation for automatically setting non-display of an annotation during execution of a program is useful for a user who desires to set non-display of an annotation during program execution and pay close attention to a program execution state.

Next, a case where the teaching device 30B operates according to the functions (F21) and (F22) described above will be described. When a check box 472 for setting whether to permit display of an annotation also at the time of execution of a program is checked (i.e., when setting that permits display of an annotation also at the time of execution of a program is carried out) in a setting screen of the annotation command icon 402 illustrated in FIG. 8A, the annotation display/non-display setting unit 133B instructs the annotation display switching unit 137B to permit display of an annotation during program execution for the annotation command icon 402.

In this case, the annotation display switching unit 137B instructs the annotation drawing processing unit 134 to display the annotation for the annotation command icon 402 also when the program 501 is being executed. As a result, in regard to the annotation command icon 402, the annotation set for the annotation command icon 402 is displayed in the program display region 300 even during program execution. By such operation, an annotation having high importance can also be displayed during program execution, while achieving an advantage that a program can be made easy to see by setting non-display of an annotation during program execution, which is useful for a user.

It should be noted that, also in the teaching device 30B, an annotation display switching button 461 may be provided, and a function of setting non-display of an annotation regardless of whether a program is being stopped or being executed may be added.

The above second embodiment describes the example of the configuration that automatically switches between display and non-display of an annotation according to an execution state of a program. As a configuration example of automatically switching between display and non-display of an annotation according to an execution state of a program, the following is also possible. In this example, display and non-display of an annotation are automatically switched according to an operation mode of the robot controller 20. Specifically, when the robot controller 20 is during automatic operation (Auto mode), an annotation is automatically not displayed as illustrated in FIG. 8B, and when the robot controller 20 is during a teaching operation (T1/T2 mode), an annotation is automatically displayed as illustrated in FIG. 8A. It can be considered that the user desires to display an annotation during the teaching operation so as to make a content of a program easy to understand, and does not need display of an annotation during the automatic operation, and thus such a function is beneficial to the user. With such a function, a need to change display setting of an annotation every time the user switches an operation mode of the robot controller 20 can be omitted.

Such a function may be achieved by adding a function of recognizing an operation mode of the robot controller 20 to the program execution state recognition unit 136 in the functional block diagram as illustrated in FIG. 7. In this case, when the robot controller 20 is during the automatic operation (Auto mode), the program execution state recognition unit 136 instructs the annotation display switching unit 137B to not display an annotation, and when the robot controller 20 is during the teaching operation (T1/T2 mode), the program execution state recognition unit 136 instructs the annotation display switching unit 137B to display an annotation.

Third Embodiment

Hereinafter, the teaching device 30C according to the third embodiment will be described. The teaching device 30C according to the third embodiment provides functions as follows in regard to switching between display and non-display of an annotation similarly to the teaching device 30B according to the second embodiment.

(F31) A basic operation is to display an annotation before program execution (during a stop) and not display an annotation during program execution.

(F32) However, setting can be accepted for each icon (each annotation command icon) in such a way as to permit display of an annotation at the time of execution of a program.

Furthermore, the teaching device 30C operates to display an annotation in an annotation display region 490 (see FIG. 10) arranged at a fixed position on a display screen.

Figure 9:
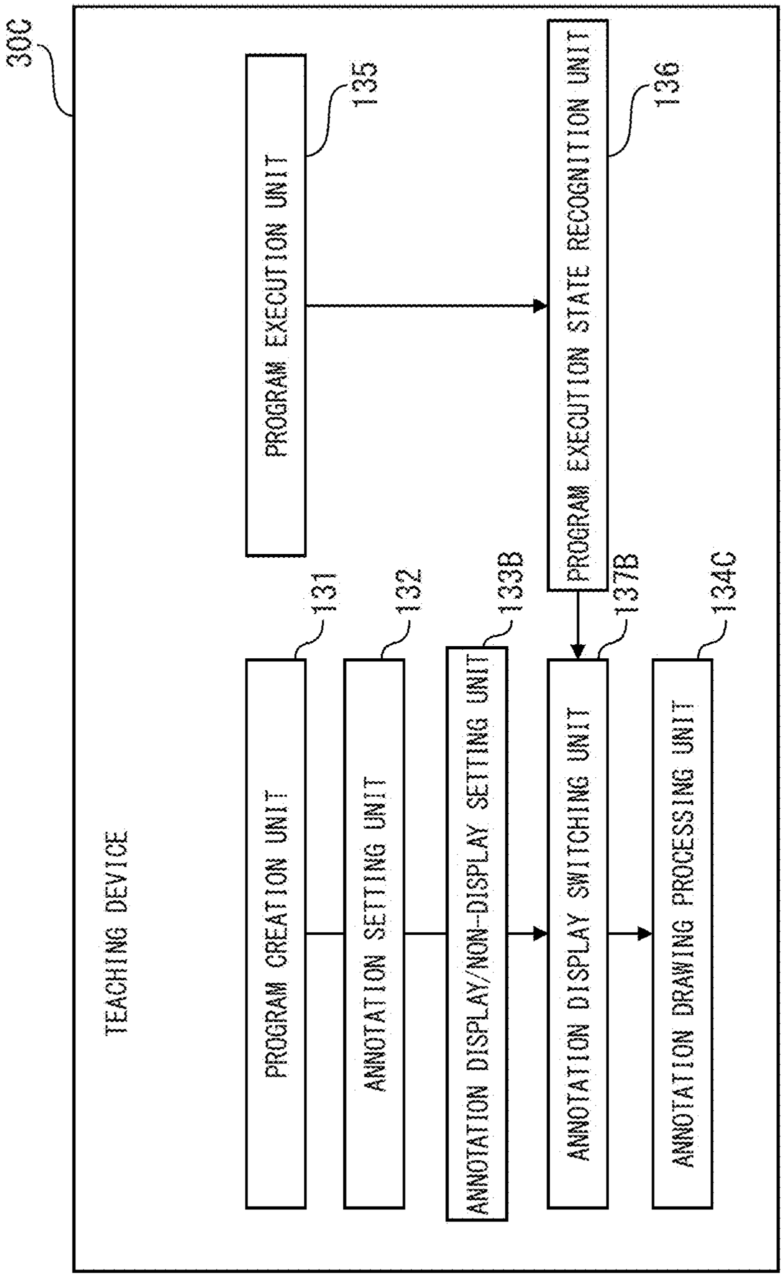
FIG. 9 is a functional block diagram of a teaching device according to a third embodiment.

FIG. 9 is a functional block diagram of the teaching device 30C. As illustrated in FIG. 9, the teaching device 30C includes a program creation unit 131, an annotation setting unit 132, an annotation display/non-display setting unit 133B, an annotation drawing processing unit 134C, a program execution unit 135, a program execution state recognition unit 136, and an annotation display switching unit 137B. Among the functions, the functions of the program creation unit 131, the annotation setting unit 132, the annotation display/non-display setting unit 133B, the program execution unit 135, the program execution state recognition unit 136, and the annotation display switching unit 137B are substantially the same as those of the teaching device 30B according to the second embodiment. The annotation drawing processing unit 134C displays an annotation in the annotation display region 490 of which the position is fixed on the display screen.

Figure 10:
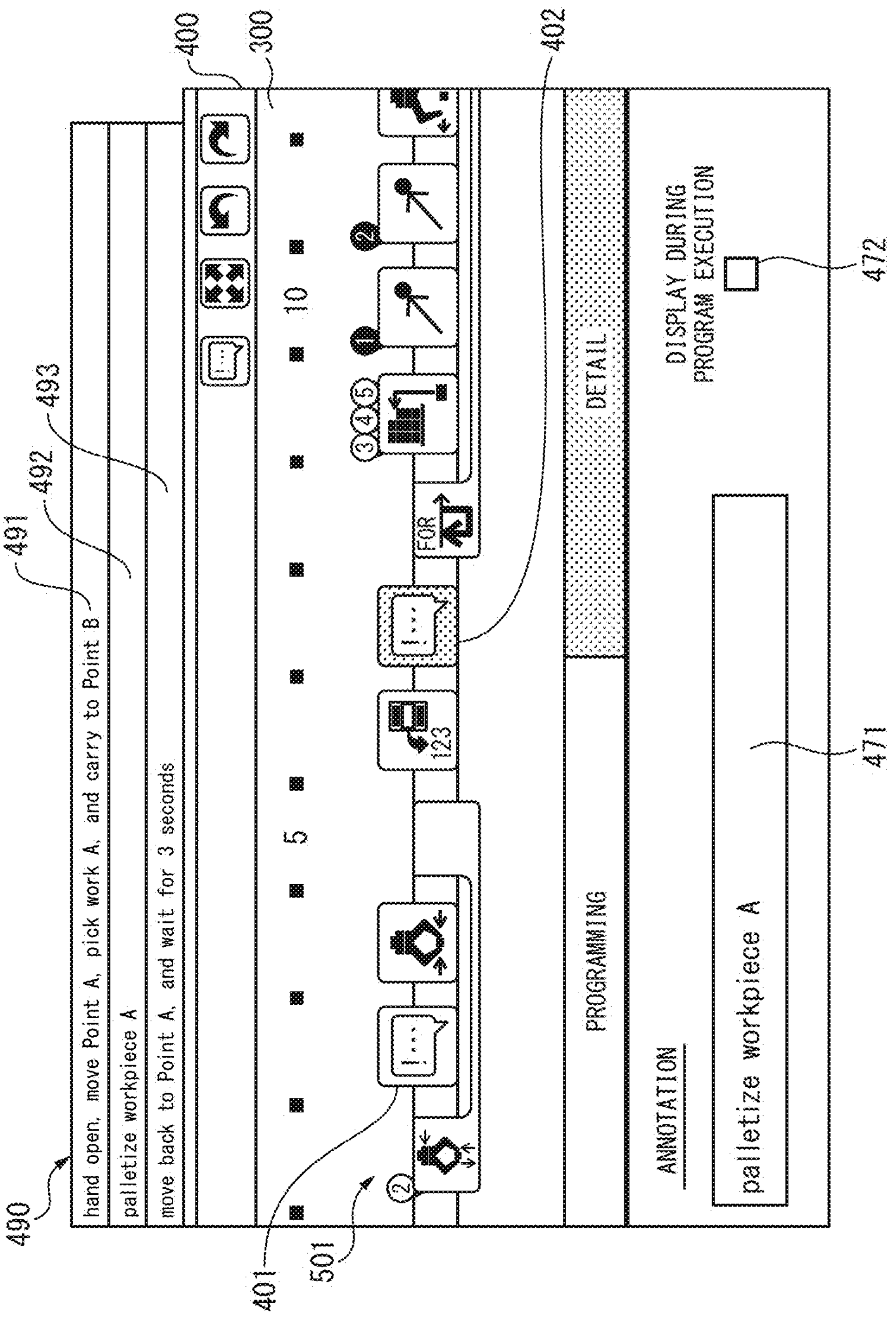
FIG. 10 is a diagram illustrating a switching function between display and non-display of an annotation by the teaching device according to the third embodiment.

FIG. 10 is a diagram illustrating a screen display example when the teaching device 30C operates according to the basic function (F1) of switching between display and non-display of an annotation according to an execution state of a program. A program (command icon) disposed in a program display region 300 and an arrangement of annotation command icons 401 and 402 are assumed to be the same as those in the second embodiment.

FIG. 10 illustrates a display state before execution of a program 501. The annotation display region 490 for displaying an annotation is provided in a fixed region of the display screen (uppermost portion of the display screen in the present example). In the present example, the annotation display region 490 is created as a region in a size in which three annotations can be arranged and displayed in a vertical direction of the display screen. The size of the annotation display region 490 illustrated in FIG. 10 is one example, and the size of the annotation display region 490 may be a different size (for example, a size in which five annotations can be displayed).

The annotation display region 490 includes three annotation display fields 491, 492, and 493. In the present example, the three annotation display fields 491, 492, and 493 may be arranged such that annotations of icons arranged in the order of execution from a start side (left side of the screen) of the program are displayed, in the annotation display region 490, in the order from the top to the bottom of the annotation display region 490 in the vertical direction. In the present example, an annotation set for the annotation command icon 401 is displayed in the annotation display field 491, and an annotation set for the annotation command icon 402 is displayed in the annotation display field 492. It should be noted that an annotation of a next annotation command icon that has not been displayed yet in the program display region 300 may be displayed in the next annotation display field 493.

When the program 501 is brought into an execution state, information indicating that the program is being executed is provided from the program execution state recognition unit 136 to the annotation display switching unit 137B, and the annotation display switching unit 137B instructs the annotation drawing processing unit 134 to set the annotations in the annotation display fields 491, 492, and 493 in the annotation display region 490 to be in a non-display state. Then, the annotation drawing processing unit 134 deletes the annotations in the annotation display fields 491, 492, and 493 (or may delete the annotation display region 490).

A case where the teaching device 30C operates according to the functions (F31) and (F32) described above will be described. As also illustrated in FIG. 10, a check box 472 for setting whether to permit display of an annotation also at the time of execution of a program may be provided in a setting screen of each annotation command icon. When the check box 472 is checked (i.e., when setting that permits display of an annotation also at the time of execution of a program is carried out) in a setting screen of an annotation command icon, the annotation display/non-display setting unit 133B instructs the annotation display switching unit 137B to permit display of an annotation during program execution for the annotation command icon. In this case, the annotation drawing processing unit 134 operates to display an annotation in the annotation display region 490 also during program execution for the annotation command icon having the setting in which display of an annotation during program execution is permitted.

With the configuration for displaying an annotation in the fixed annotation display region 490 provided independently of the program display region 300, annotations can be displayed while avoiding occurrence of a situation where the program display region 300 becomes complicated by annotations.

Fourth Embodiment

Hereinafter, the teaching device 30D according to the fourth embodiment will be described. The teaching device 30D provides functions as follows in regard to a switching function between display and non-display of an annotation.

(F41) An annotation set for an icon (annotation command icon) at an execution position is a target of display during execution of a program.

(F42) Whether to permit display of an annotation at the time of execution of a program can be set for each icon (each annotation command icon).

Figure 11:
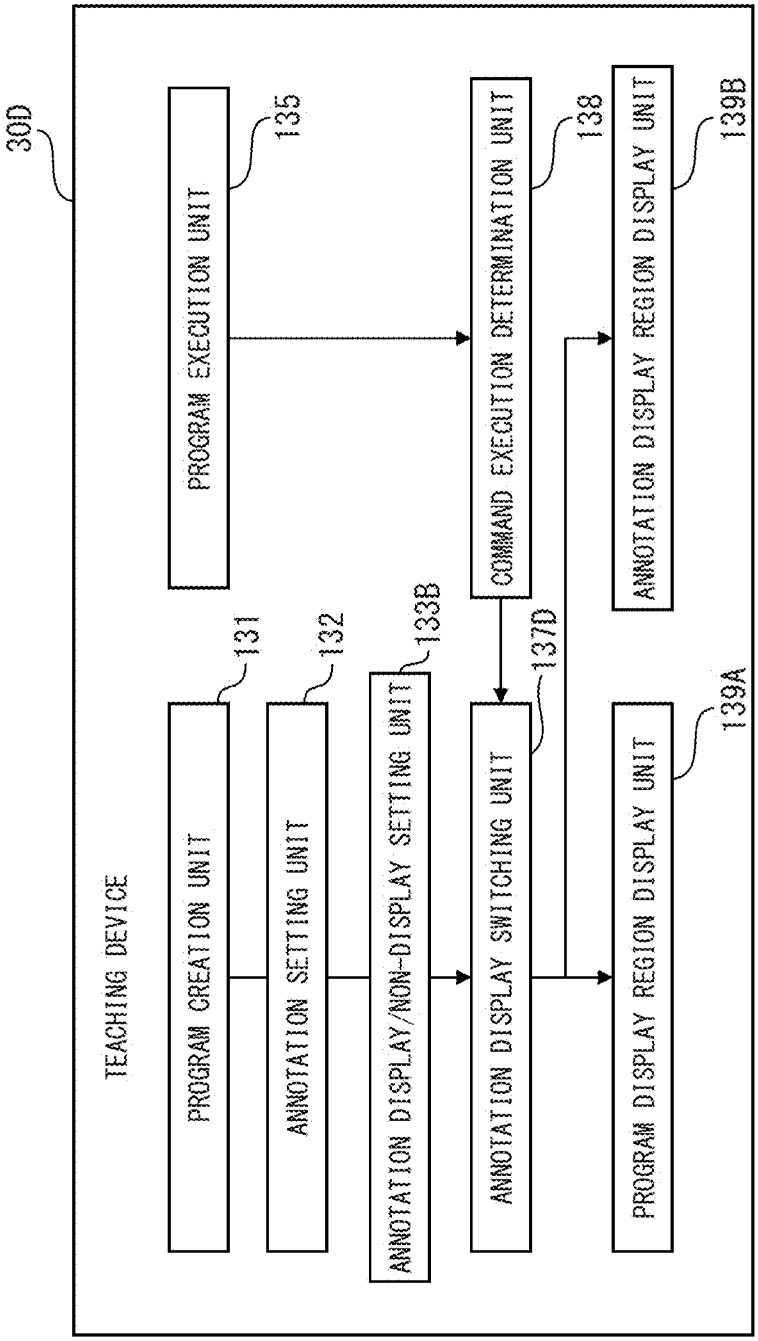
FIG. 11 is a functional block diagram of a teaching device according to a fourth embodiment.

FIG. 11 is a functional block diagram of the teaching device 30D. As illustrated in FIG. 11, the teaching device 30D includes a program creation unit 131, an annotation setting unit 132, an annotation display/non-display setting unit 133B, a program execution unit 135, an annotation display switching unit 137D, a command execution determination unit 138, a program display region display unit 139A, and an annotation display region display unit 139B. Among the functions, the functions of the program creation unit 131, the annotation setting unit 132, the annotation display/non-display setting unit 133B, and the program execution unit 135 are substantially the same as those of the teaching device 30B according to the second embodiment.

The program execution determination unit 138 acquires information about which position a program 501 is currently executed, based on information, which is provided from the program execution unit 135, about an execution state of the program 501, and instructs the annotation display switching unit 137D to set an annotation command icon located at an execution position of the program 501 to be a target of annotation display.

The annotation display switching unit 137D notifies the program display region display unit 139A or the annotation display region display unit 139B of an instruction on whether to display an annotation set for an annotation command icon located at an execution position.

The program display region display unit 139A provides a function of displaying, in a program display region 300, an annotation in a flag form added to an annotation command icon as illustrated in FIG. 8A. The annotation display region display unit 139B provides a function of displaying an annotation in a fixed region on a display screen in the style as illustrated in FIG. 10. The teaching device 30D is configured to be able to perform operation of displaying an annotation in a flag form in the program display region by the program display region display unit 139A or operation of displaying an annotation in the annotation display region by the annotation display region display unit 139B.

Figure 12A:
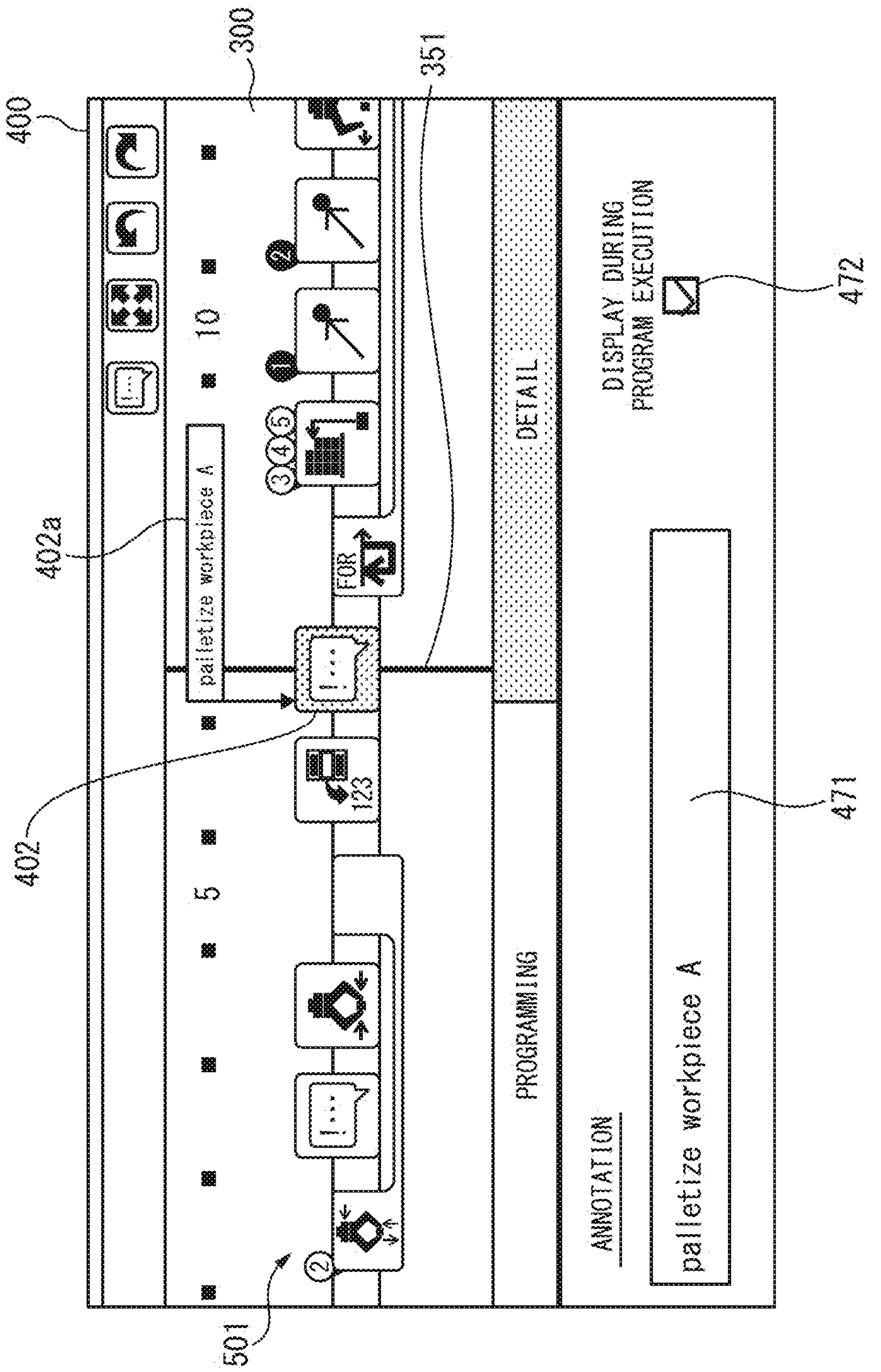
FIG. 12A is a diagram illustrating a switching function between display and non-display of an annotation by the teaching device according to the fourth embodiment.

With reference to FIG. 12A, an operation example where the teaching device 30D operates according to the functions (F41) and (F42) described above will be described. In FIG. 12A, a program (command icon) arranged in the program display region 300, an arrangement of an annotation command icon 402, and an annotation set for the annotation command icon 402 are assumed to be the same as those in the first embodiment. FIG. 12A illustrates a situation where a current execution position of the program 501 is located at a position of the annotation command icon 402. A vertical bar 351 indicating the execution position of the program overlaps the annotation command icon 402. In this case, the command execution determination unit 138 provides information indicating that the annotation command icon 402 is located at the execution position to the annotation display switching unit 137D.

The annotation display/non-display setting unit 133B sends, to the annotation display switching unit 137D, an instruction on setting (setting of a check box 472) as to whether to permit annotation display during program execution. Herein, display of an annotation during execution of the annotation command icon 402 is assumed to be permitted. Therefore, as illustrated in FIG. 12A, the annotation display switching unit 137D operates to display an annotation 402*a* ("palletize workpiece A") of the annotation command icon 402 currently located at an execution position.

In the example in FIG. 12A, a case where the program display region display unit 139A has a function of drawing an annotation is assumed. Thus, in the display screen in FIG. 12A, the annotation 402*a* set for the annotation command icon 402 is displayed in a flag form in the program display region 300.

According to the present embodiment, an icon (annotation command icon) located at an execution position is a target of display, and thus there is also an advantage that an annotation is also easy to recognize for a user, in particular, who pays close attention to a position of a command currently executed.

As an additional function to the functions (F41) and (F42) of switching between display and non-display of an annotation described above, whether to permit display of an annotation during a stop of a program may be able to be set for each annotation command icon by providing setting (check box) as to whether to permit display of the annotation during a stop of a program in a setting screen of each annotation command icon. In this case, when the program is stopped in a state of the display screen as illustrated in FIG. 12A, whether to display an annotation set for the annotation command icon 402 can be set.

The operation example described above is an operation example when the program display region display unit 139A serves to draw an annotation, but the teaching device may be set in such a way that the annotation display region display unit 139B serves to draw an annotation. Hereinafter, a case where the teaching device 30D operates according to the functions (F41) and (F42) described above and the annotation display region display unit 139B serves to draw an annotation will be described with reference to FIG. 12B.

Figure 12B:
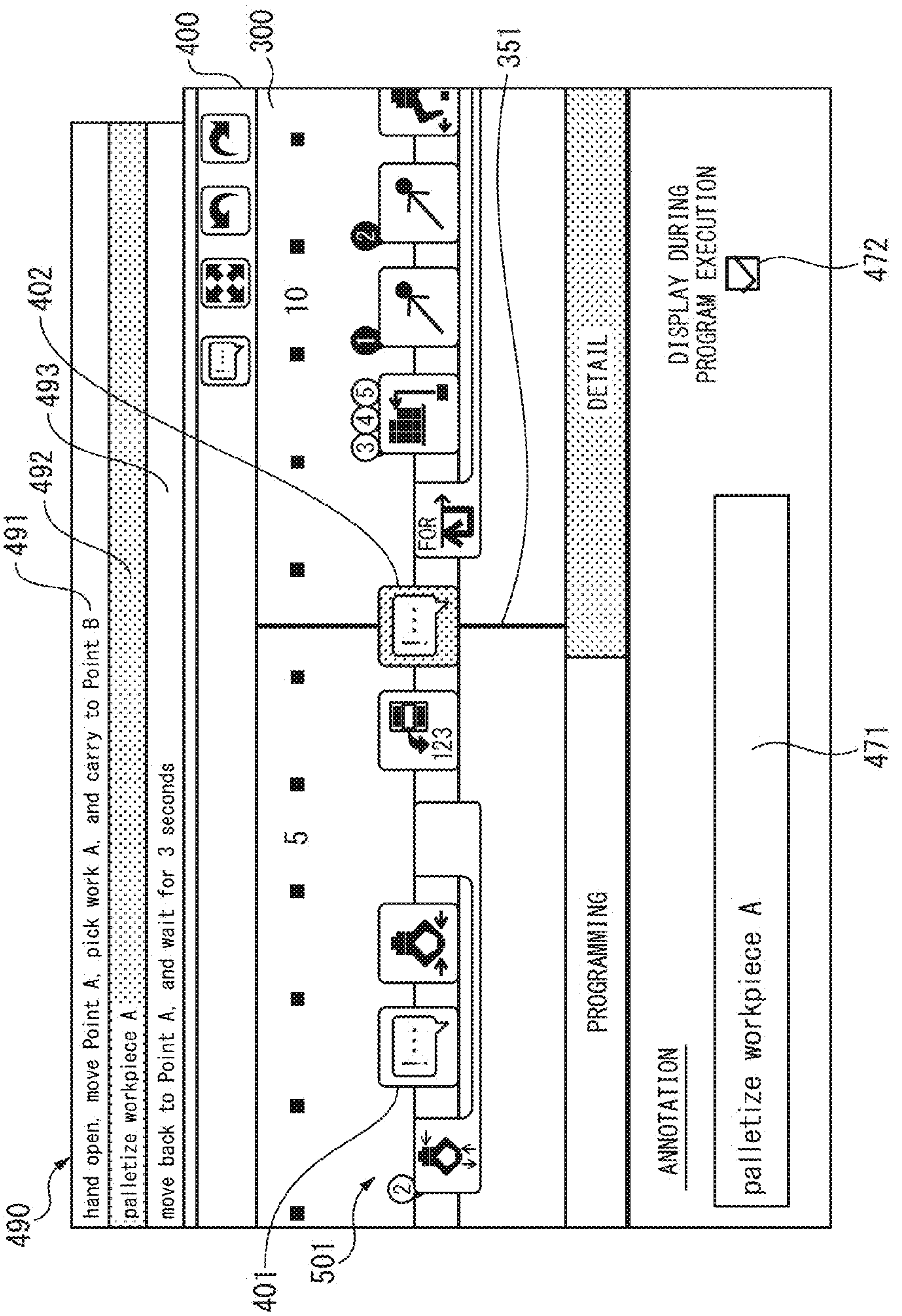
FIG. 12B is a diagram illustrating a switching function between display and non-display of an annotation by the teaching device according to the fourth embodiment.

As illustrated in FIG. 12B, the program 501 is executed, and the annotation command icon 402 is currently located at an execution position. The command execution determination unit 138 provides information indicating that the annotation command icon 402 is located at the execution position to the annotation display switching unit 137D.

In this case, the annotation display region display unit 139B displays, in an annotation display field 492 located at the center in the vertical direction of an annotation display region 490, an annotation set for the annotation command icon 402 currently executed, and also displays the annotation in an emphasized manner. The emphasized display of an annotation can be performed by various ways of changing a character of an annotation to a bold character, changing a color, changing a color or a pattern of an annotation display field, and the like. In the program display region 300, the annotation command icon 402 being currently executed is displayed in an emphasized manner. A manner of emphasized display of an annotation (annotation display field) and a manner of emphasized display of an annotation command icon during execution may be set the same. The emphasized display of an annotation and an icon may be achieved in cooperation between the functional blocks of the teaching device 30D. In this way, an annotation command icon during execution and an annotation displayed in the annotation display region 490 are displayed in an emphasized manner, and thus a user can immediately recognize which annotation command icon is executed, and also immediately recognize an annotation set for the annotation command icon.

In the annotation display region 490, an annotation set for an annotation command icon 401 executed right before the annotation command icon 402 may be displayed in an annotation display field 491 located on an upper row above the annotation display field 492 that displays an annotation of an annotation command icon being currently executed. Further, an annotation set for an annotation command icon (it is assumed that the annotation command icon has not yet entered the program display region 300) to be executed after the annotation command icon 402 may be displayed in an annotation display field 493 located on a lower row below the annotation display field 492.

It should be noted that execution time of an annotation command icon itself is relatively short, and thus display of an annotation in the annotation display region 490 may be maintained for a predetermined period of time since the annotation command icon is executed. Specifically, during a predetermined period of time since execution of the annotation command icon 402 starts and an annotation of the annotation command icon 402 is displayed in the annotation display field 492, the annotation set for the annotation command icon 402 may continue to be displayed in the annotation display field 492 even after execution of the annotation command icon 402 ends.

Fifth Embodiment

Hereinafter, the teaching device 30E according to the fifth embodiment will be described. The teaching device 30E provides a function of displaying an annotation in a style in which a range to which an annotation is applied is clearly expressed in a program display region 300.

Figure 13:
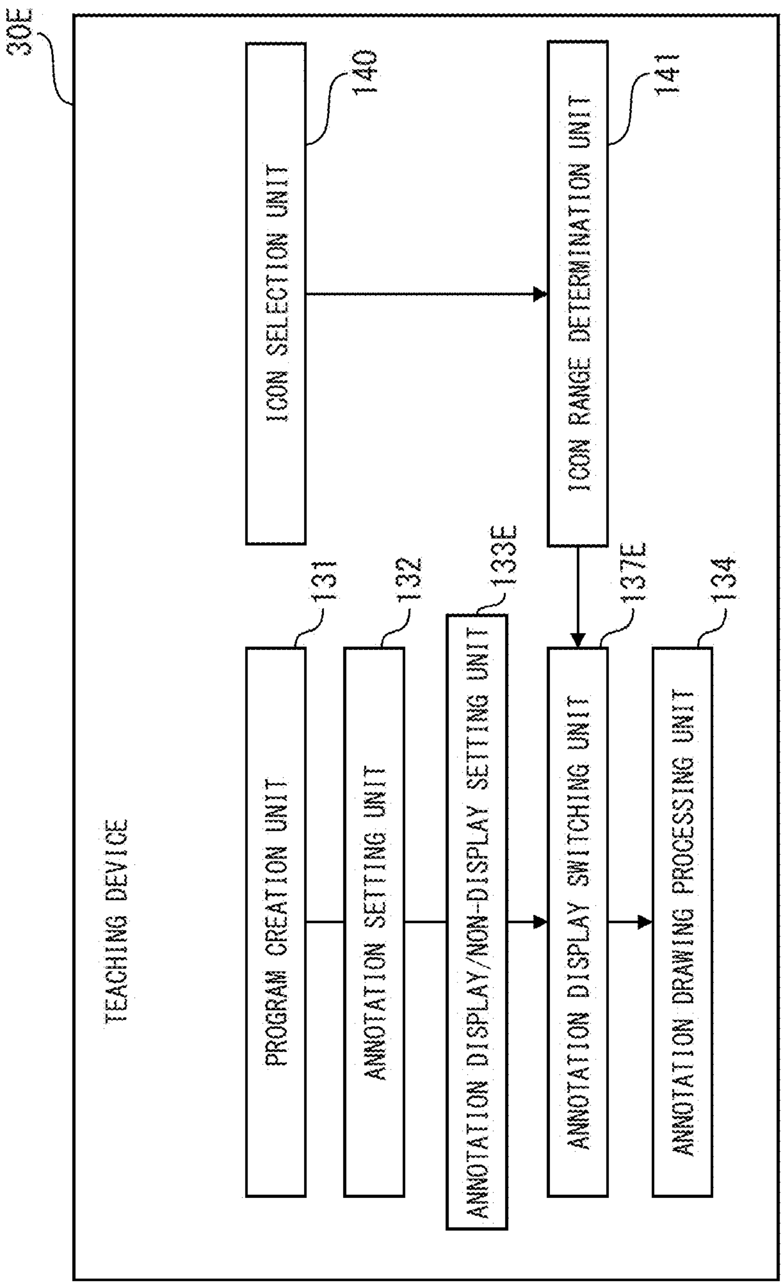
FIG. 13 is a functional block diagram of a teaching device according to a fifth embodiment.

FIG. 13 is a functional block diagram of the teaching device 30E. As illustrated in FIG. 13, the teaching device 30E includes a program creation unit 131, an annotation setting unit 132, an annotation display/non-display setting unit 133E, an annotation display switching unit 137E, an annotation drawing processing unit 134, an icon selection unit 140, and an icon range determination unit 141. In the functional block diagram, the functions of the program creation unit 131, the annotation setting unit 132, and the annotation drawing processing unit 134 are substantially the same as those of the first embodiment.

The annotation display/non-display setting unit 133E is configured to receive (1) setting as to display or not display an annotation when a range annotation icon (see a range annotation icon 403 in FIG. 14A) is selected, and (2) setting as to whether to permit display of an annotation during program execution.

The icon selection unit 140 supports an operation of selecting an icon arranged in the program display region 300. For example, the icon selection unit 140 may indicate a selected state of an icon by changing a color and the like of the icon when the icon is selected by a user operation of putting a cursor on the icon.

The icon range determination unit 141 determines whether an icon selected by the user is included in a range annotation icon, and provides information about a determination result to the annotation display switching unit 137E. When a selected icon is a range annotation icon, the icon range determination unit 141 provides information indicating that the range annotation icon is selected to the annotation display switching unit 137E.

When an icon selected by the user is included in a range of a range annotation icon or when a range annotation icon is selected, the annotation display switching unit 137E instructs the annotation drawing processing unit 134 to display annotations set for the range annotation icon and the icon included in the range of the range annotation icon.

Hereinafter, an operation example of a switching function between display and non-display of an annotation by the teaching device 30E will be described with reference to FIGS. 14A and 14B. In the program display region 300 illustrated in FIGS. 14A and 14B, a program 502 including annotation command icons 401 and 402 and wide range annotation icons 403 and 404 is created.

Figure 14A:
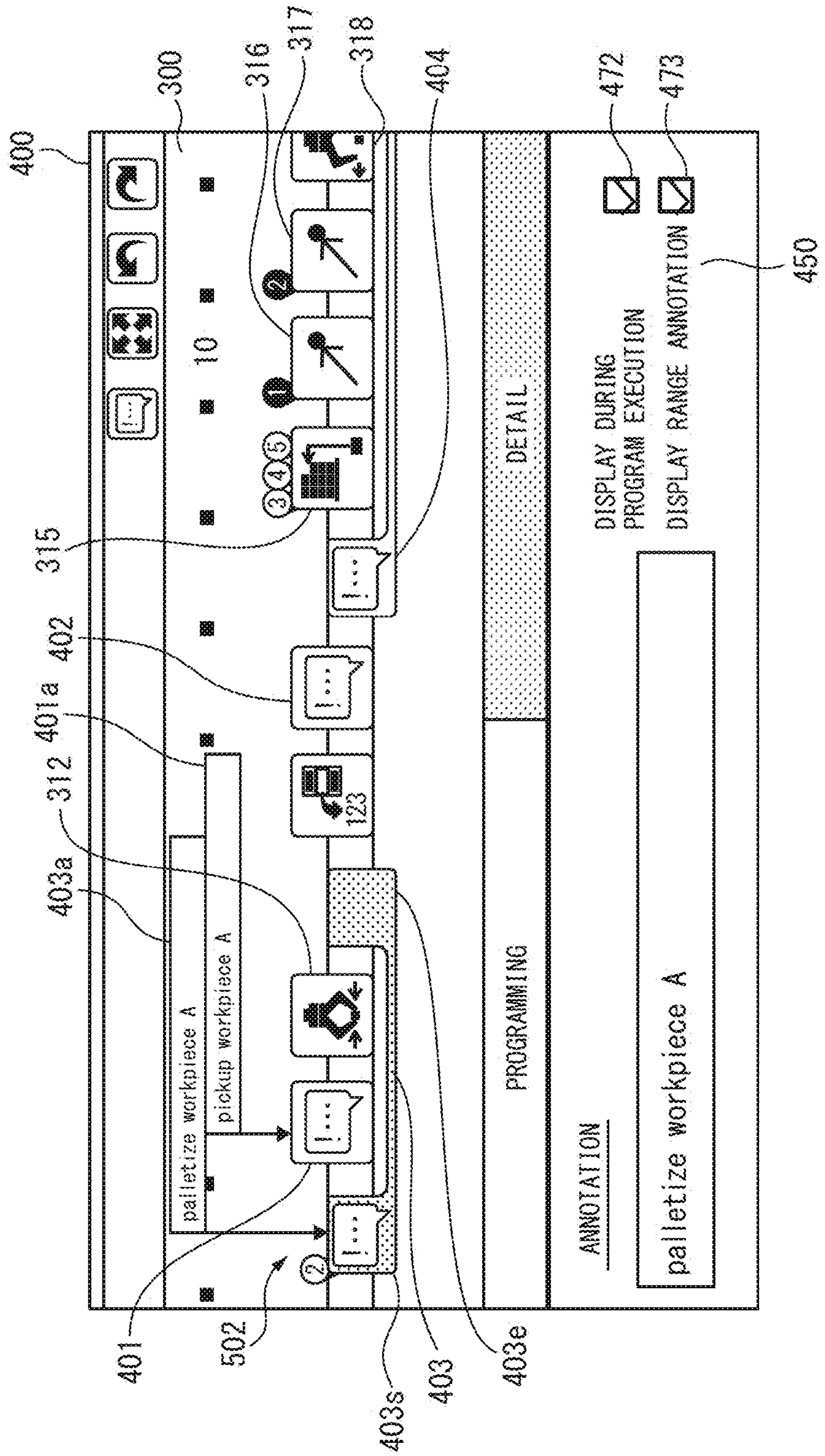
FIG. 14A is a diagram illustrating a switching function between display and non-display of an annotation by the teaching device according to the fifth embodiment.

As illustrated in FIG. 14A, the annotation command icon 401 and a hand close icon 312 are included in a range of the range annotation icon 403, and it is clearly and graphically expressed that the annotation command icon 401 and the hand close icon 312 are located in the range to which the range annotation icon 403 is applied. In other words, for the range annotation icon 403, a start end position 403*s* and a terminal end position 403*e* of the range to which the annotation applies in the program are clear. It should be noted that a size in a width direction of a range annotation icon can be changed by a user operation. Further, a palletizing icon 315, linear movement icons 316 and 317, a hand open icon 318, and the like are included in a range of the range annotation icon 404, and it is clearly and graphically expressed that the palletizing icon 315, the linear movement icons 316 and 317, the hand open icon 318, and the like are located in the range to which the range annotation icon 404 is applied.

FIG. 14A is a display screen example before execution (during a stop) of the program. Herein, a state where the range annotation icon 403 is selected by a user operation is assumed. As illustrated in FIG. 14A, a setting screen 450 of the range annotation icon 403 is displayed in a lower portion of a program creation screen 400. The setting screen is provided with a check box 472 for setting whether to permit display of an annotation also at the time of execution of a program, and a check box 473 for setting whether to permit display of an annotation when a range annotation icon is selected. Herein, the check box 472 and the check box 473 are checked, and display of an annotation during program execution and display of an annotation when a range annotation icon is selected are permitted.

In the state of FIG. 14A, the icon range determination unit 141 notifies the annotation display switching unit 137E that the range annotation icon 403 is being selected. In this case, the annotation display switching unit 137E instructs the annotation drawing processing unit 134 to display an annotation set for the range annotation icon 403. Further, the annotation command icon 401 is also included in the range of the range annotation icon 403, and thus the icon range determination unit 141 also instructs the annotation display switching unit 137E that the annotation command icon 401 is included in the range annotation icon 403. In this case, the annotation display switching unit 137E instructs the annotation drawing processing unit 134 to also display an annotation of the annotation command icon 401.

As a result, as illustrated in FIG. 14A, an annotation 403*a* ("palletize workpiece A") set for the range annotation icon 403 and an annotation 401*a* ("pickup workpiece A") set for the annotation command icon 401 are displayed in a flag form in the program display region 300.

It should be noted that, also in a situation where the annotation command icon 401 or the hand close icon 312 included in the range of the range annotation icon 403 is selected by a user operation, the icon range determination unit 141 determines that the icons are also included in the range of the range annotation icon 403, and the annotations set for the range annotation icon 403 and the annotation command icon 401 are displayed similarly to the state illustrated in FIG. 14A.

Figure 14B:
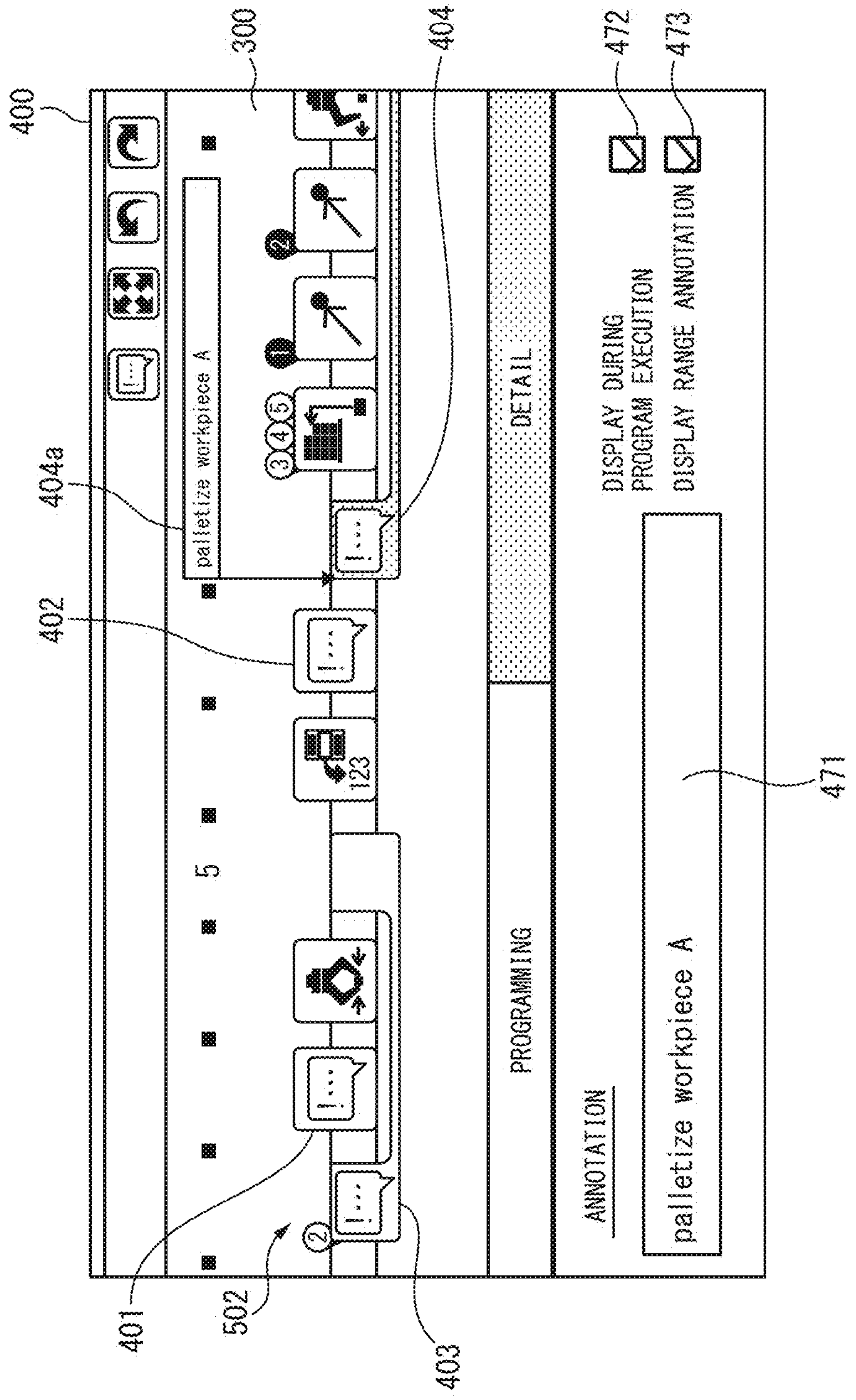
FIG. 14B is a diagram illustrating a switching function between display and non-display of an annotation by the teaching device according to the fifth embodiment.

FIG. 14B illustrates a state where the range annotation icon 404 is selected in the program display region 300 by a user operation in the display state in FIG. 14A. By canceling the selection of the range annotation icon 403, the annotation drawing processing unit 134 deletes the annotations of the range annotation icon 403 and the annotation command icon 401. By selecting the range annotation icon 404, an annotation 404*a* ("palletize workpiece A") set for the range annotation icon 404 is newly displayed in a flag form in the program display region 300.

It should be noted that the user can freely set a size in the width direction of a range annotation icon under support by the program creation unit 131. The user is allowed to create a program in a way where the user includes a desired icon in a range of a range annotation icon.

According to such a present embodiment, an annotation associated with a range annotation icon is displayed in a state where the range annotation icon clearly and graphically expresses a range to which an annotation is applied (a start end position and a terminal end position of the range to which the annotation is applied), and thus a user can check a content of the annotation while clearly grasping the range to which the annotation is applied. By displaying a range annotation icon in a selected state in an emphasized manner, the user can more clearly grasp a range to which an annotation is applied.

In the first embodiment to the fifth embodiment described above, the configuration example in which an annotation is set for an annotation command icon or a wide range annotation command icon being a special icon for displaying the annotation is described, but an icon to which an annotation can be set is not limited to the special icon for setting the annotation. For example, a command icon such as a palletizing command icon may be configured in such a way that an annotation can be set thereto. In this case, a setting field of an annotation described above and various check boxes for setting display and non-display of an annotation are provided in a setting screen of the palletizing command icon. In this way, a switching function between display and non-display of an annotation similar to a case where a special annotation command icon and a special range annotation command icon are used can be achieved.

Sixth Embodiment

Hereinafter, the teaching device 30F according to the sixth embodiment will be described. The teaching device 30F relates to a configuration in which switching between display and non-display of an annotation is applied to a program on a text basis. The teaching device 30F has a function of switching between display and non-display of an annotation according to whether a program is being executed.

Figure 15:
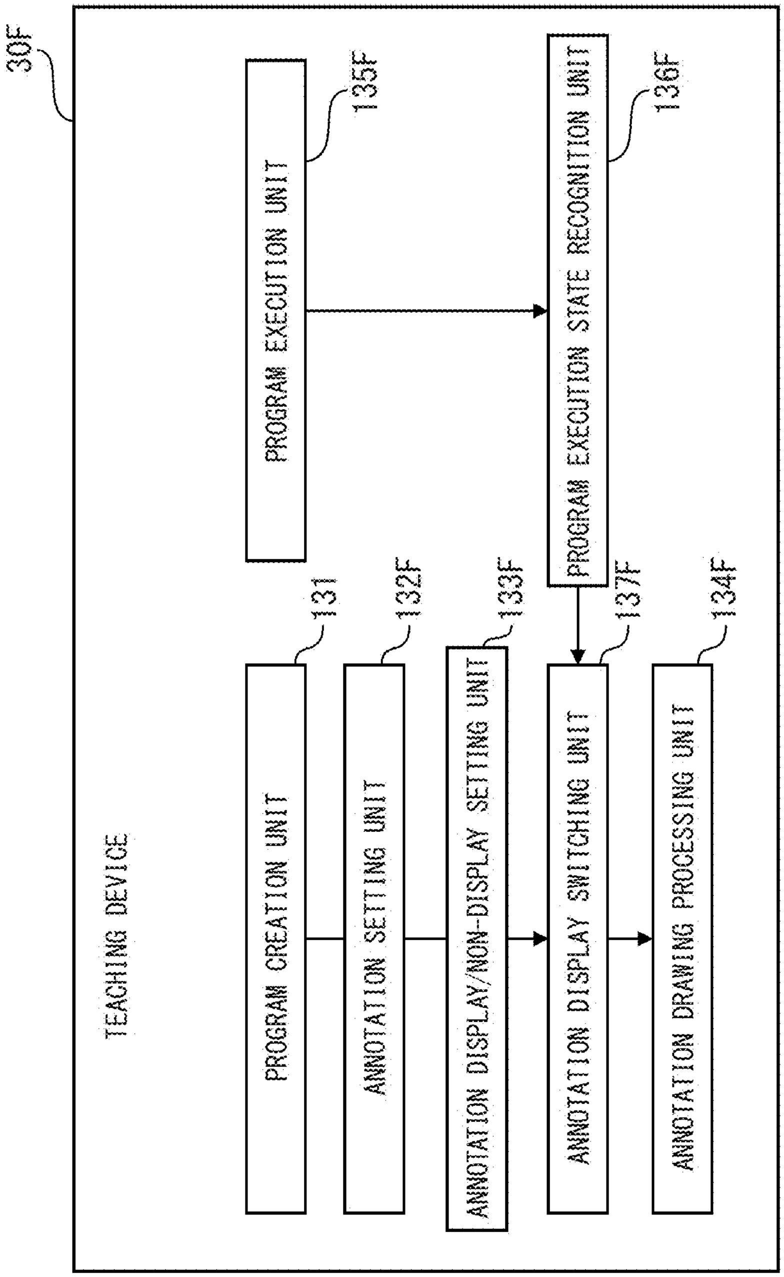
FIG. 15 is a functional block diagram of a teaching device according to a sixth embodiment.

FIG. 15 is a diagram illustrating a functional block diagram of the teaching device 30F. The teaching device 30F includes a program creation unit 131, an annotation setting unit 132F, an annotation display/non-display setting unit 133F, a program execution unit 135F, a program execution state recognition unit 136F, an annotation display switching unit 137F, and an annotation drawing processing unit 134F.

The program creation unit 131 provides various functions for supporting program creation on a text basis, including provision of a program creation screen for creating a program.

The annotation setting unit 132F provides a function of setting an annotation for a program on a text basis.

The annotation display/non-display setting unit 133F provides a function of adding, to each annotation, setting related to display and non-display of an annotation.

The program execution unit 135F has a function of executing a program created in the program creation screen.

The program execution state recognition unit 136F receives information about an execution state of a program from the program execution unit 135F, recognizes whether the program is being executed, and provides information indicating whether the program is being executed to the annotation display switching unit 137F.

The annotation display switching unit 137F instructs the annotation drawing processing unit 134 to switch between display and non-display of an annotation, based on information, which is provided from the annotation display/non-display setting unit 133F, about setting of display and non-display of the annotation, and the information, which is provided from the program execution state recognition unit 136F, indicating whether the program is being executed.

The annotation drawing processing unit 134F draws or deletes the annotation on or from a display screen according to the switching instruction between display and non-display of the annotation by the annotation display switching unit 137F.

Hereinafter, an operation example of a switching function between display and non-display of an annotation by the teaching device 30F will be described with reference to FIGS. 16 to 18. FIG. 16 illustrates a program 511 created in a program display region 300A displayed as a part of a program creation screen under support by the program creation unit 131 of the teaching device 30F. An input of an annotation is also carried out on the program 511. It is assumed that display and non-display of an annotation follows the following rules in the program 511 on a text basis.

(R1) To display an annotation content all the time (during non-execution and execution of a program), the annotation content is described after a first symbol ("!" in the present example).

(R2) To not display an annotation content during program execution, the annotation content is described after a second symbol ("!!" in the present example).

An annotation is input to the program 511 according to the rules (R1) and (R2) described above. Specifically, each of an annotation "start movement of workpiece A" in a first row and an annotation "end movement of workpiece A" in a 14th row is described after "!", and each of an annotation "close hand" in a second row, an annotation "rise" in a fourth row, an annotation "move to point A" in a sixth row, an annotation "lower" in an eighth row, an annotation "open hand" in a tenth row, and an annotation "wait" in a 12th row is described after "!!". As illustrated in FIG. 16, all the input annotations are displayed before execution of the program.

In the present embodiment, the annotation setting unit 132F provides a function of setting, as annotation, text after the first symbol and the second symbol as described above. The annotation display/non-display setting unit 133F provides, to the annotation display switching unit 137F, setting information about whether to permit display of the annotation at the time of execution of a program according to the first symbol and the second symbol. Then, the annotation display switching unit 137F instructs the annotation drawing processing unit 134F to switch between display and non-display of the annotation according to the setting information from the annotation display/non-display setting unit 133F.

FIG. 17 illustrates a display state at the time of execution of the program 511 in the program display region 300A. Due to the program execution state, the annotations in the second row, the fourth row, the sixth row, the eighth row, the tenth row, and the 12th row are in a non-display state. On the other hand, the annotations in the first row and the 14th row are displayed also at the time of execution.

In this way, by providing a function of setting non-display of an annotation at the time of program execution, a user can improve readability of the program by displaying all annotations before program execution (during a stop), also reduce the number of annotations displayed during program execution, and avoid complicatedness of the program display region 300A. In a different expression, the user can specify an annotation having a high degree of importance and being desired to be displayed also during program execution.

Figure 18:
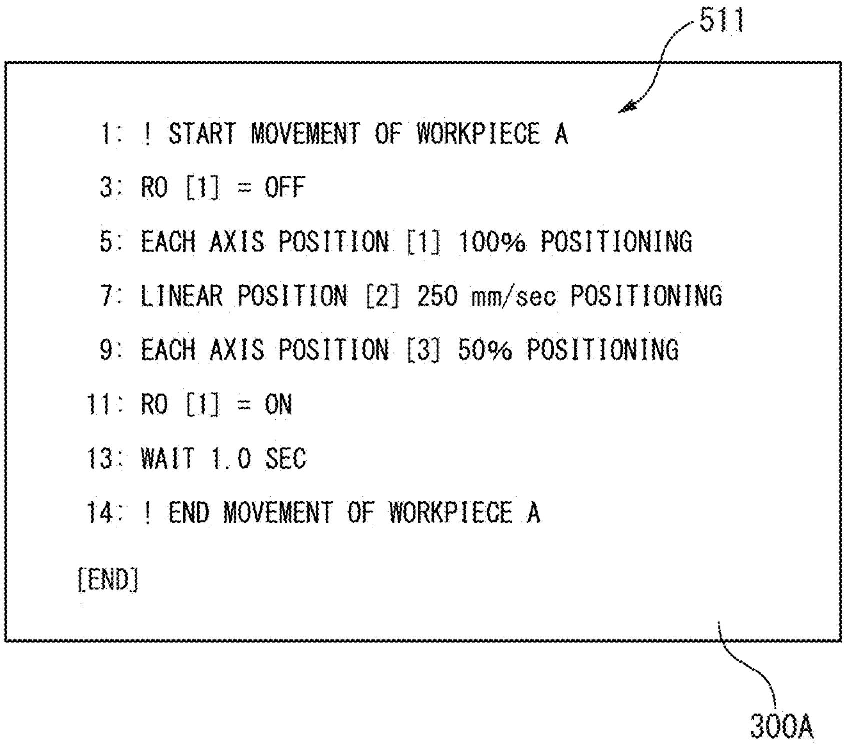
FIG. 18 is a diagram illustrating a display state of a program and an annotation during execution of the program in the teaching device according to the sixth embodiment, and a display example different from FIG. 17.

FIG. 18 is a diagram illustrating another display example at the time of execution of the program 511 shown in FIG. 16. As illustrated in FIG. 18, the present display example is an operation example of performing display by closing a blank row caused by non-display of an annotation at the time of execution. The entire program 511 is displayed by closing the blank row, and thus the program display region 300A is made compact, the program 511 is easy to view, and a greater number of rows including command sentences can be displayed. The annotation display switching unit 137F can be configured to serve to perform such a display. For example, the annotation display switching unit 137F may provide, to the program creation unit 131, information about a blank row caused by non-display of an annotation at the time of program execution, and display a program while closing the blank row.

It should be noted that, also in the teaching device 30F according to the sixth embodiment, an operation button that collectively switches between display and non-display of an annotation in the program display region 300A, such as the annotation display switching button 461 in the teaching device 30A according to the first embodiment, may be provided on a display screen.

Seventh Embodiment

Hereinafter, the teaching device 30 according to the seventh embodiment will be described. The teaching device 30 according to the seventh embodiment relates to a specific technique for switching between display and non-display of an annotation and a display style, and corresponds to a modification of a part of the function of the teaching device 30A according to the first embodiment. Thus, the teaching device 30 according to the seventh embodiment will be described below with reference to the functional block diagram (FIG. 3) in the first embodiment.

Figure 19:
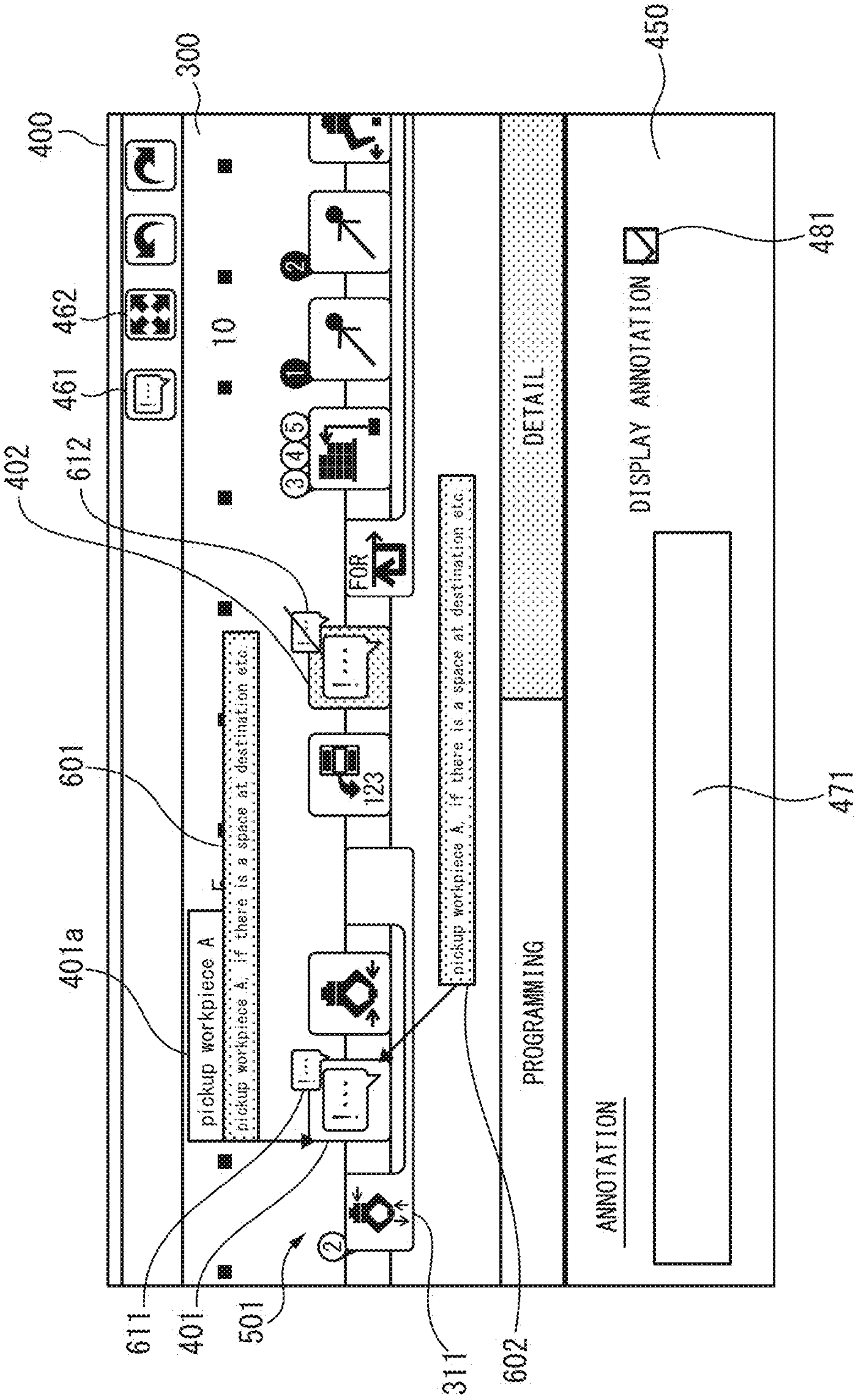
FIG. 19 is a diagram illustrating a switching function between display and non-display of an annotation by a teaching device according to a seventh embodiment.

FIG. 19 is a diagram illustrating a switching function between display and non-display of an annotation and a display style of the annotation by the teaching device 30 according to the present embodiment. The functions are achieved in cooperation among functional elements (a program creation unit 131, an annotation setting unit 132, an annotation display/non-display setting unit 133, an annotation display switching unit 137, and an annotation drawing processing unit 134) of the teaching device 30. Similarly to the example illustrated in FIG. 5, a program 501 is created in a program creation region 300.

As illustrated in FIG. 19, the present embodiment provides a function of adding, to each annotation command icon, a small icon (611, 612) so as to enable a user to immediately grasp whether or not an annotation is set. Herein, it is assumed that an annotation is set for an annotation command icon 401 via a setting screen 450, whereas an annotation is not set for an annotation command icon 402. In this case, information about presence and absence of setting of an annotation in an annotation input field 471 is notified to the program creation unit 131 via the annotation setting unit 132. The program creation unit 131 adds the small icons 611 and 612 indicating whether or not an annotation content is present to the annotation command icons 401 and 402, respectively, and performs display. In the present example, the small icon 611 indicating presence of an annotation is added to the annotation command icon 401. On the other hand, the small icon 612 indicating that an annotation is not set is added to the annotation command icon 402.

In the present embodiment, when the small icon 611 indicating presence of the annotation is selected by a tap operation and the like, the annotation of the annotation command icon 401 corresponding to the small icon 611 is displayed. In a state where the small icon 611 is not selected, a non-display state of the annotation is maintained. The annotation display switching unit 137 cooperates with the program creation unit 131, and achieves such a switching function between display and non-display of an annotation.

Display of an annotation may be performed in a manner as follows in order to improve convenience of a user who uses an annotation function. A content of an annotation displayed when the small icon 611 indicating presence of the annotation is touched may be shortened. In the example in FIG. 19, in a case where the annotation set for the annotation command icon 401 is "pickup workpiece A, if there is a space at destination etc.", an annotation 401*a* displayed in the program display region 300 when the small icon 611 is touched is "pickup workpiece A" in a shortened manner.

Then, when the shortened annotation 401*a* is touched or dragged, the annotation is displayed in an emphasized manner so that the whole sentence is also displayed (annotation 601). Further, in this case, for example, the annotation 601 may be drawn in the frontmost layer so that display of the whole sentence of the annotation 601 is prioritized over the other annotations in the program display region 300.

Further, the display position of the annotation 601 of which the whole sentence is displayed may be movable in the display screen by a drag operation and the like. FIG. 19 illustrates a state where the annotation 601 is moved to a place indicated by a reference sign 602. Such a function is beneficial to the user when the user desires to temporarily move an annotation or when the user desires to carefully check a content of an annotation.

The drawing function of an annotation described above can be achieved by the annotation drawing processing unit 134 cooperating with the other functional elements.

According to the configuration as described above, there is an advantage that an annotation needed by a user can be appropriately displayed while a space for displaying an annotation is prevented from being complicated or full.

Furthermore, in the operation described above in the present embodiment, setting as to whether to permit or not permit annotation display by a check box 481 may effectively act. For example, when the check box 481 is not checked (display of an annotation is not permitted), a small icon added to an annotation command icon of this setting may be the small icon 612 indicating absence of an annotation.

Eighth Embodiment

Hereinafter, the teaching device 30 according to the eighth embodiment will be described. The teaching device 30 according to the eighth embodiment relates to a specific technique for switching between display and non-display of an annotation and a display style, and corresponds to a modification of a part of the function of the teaching device 30A according to the first embodiment. Thus, the teaching device 30 according to the eighth embodiment will be described below with reference to the functional block diagram (FIG. 3) in the first embodiment.

Figure 20:
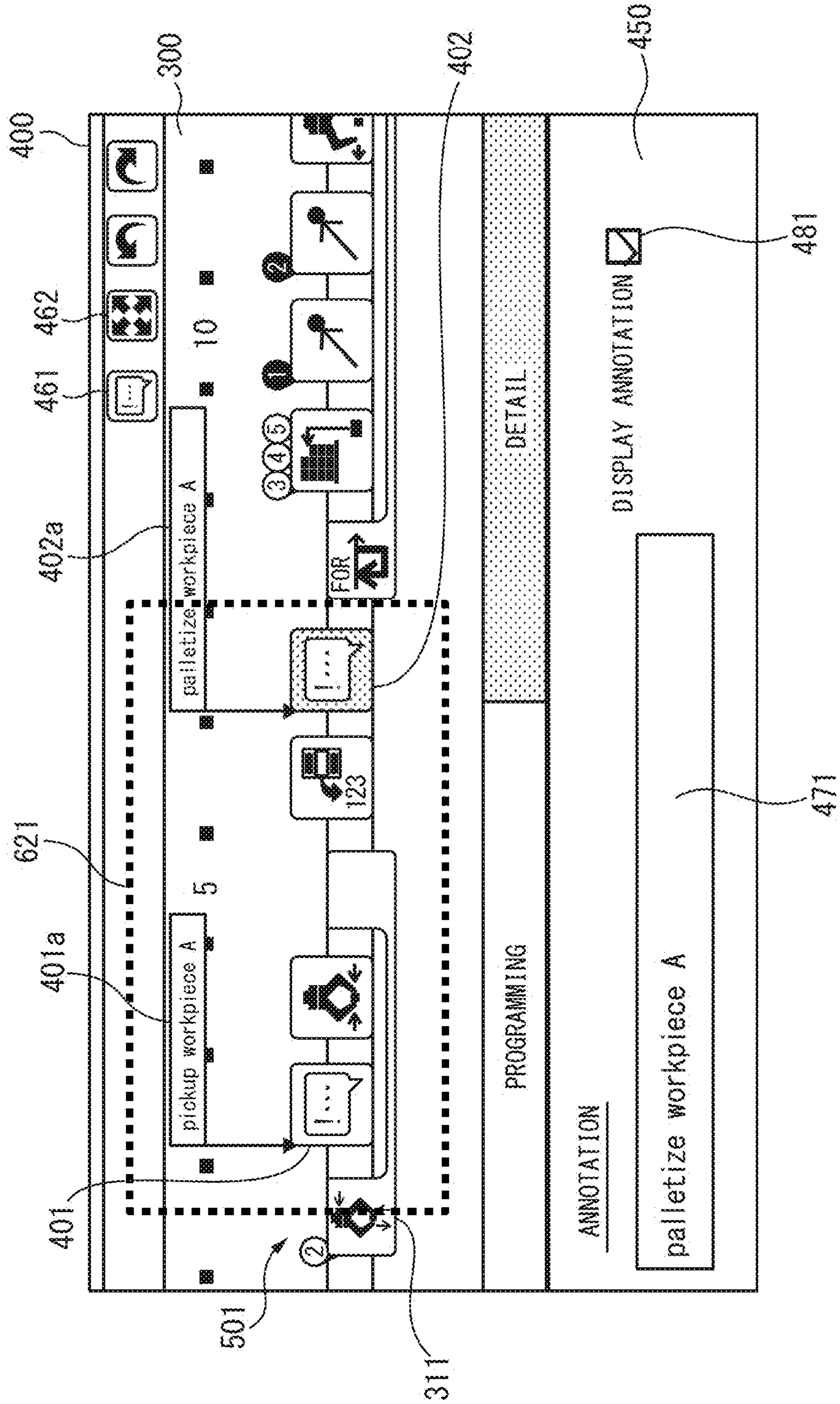
FIG. 20 is a diagram illustrating a switching function between display and non-display of an annotation by a teaching device according to an eighth embodiment.

FIG. 20 is a diagram illustrating a switching function between display and non-display of an annotation and a display style of the annotation by the teaching device 30 according to the present embodiment.

It is assumed that an annotation "pickup workpiece A" is set for an annotation command icon 401 via a setting screen 450, and an annotation "palletize workpiece A" is set for an annotation command icon 402 via the setting screen 450. A function of collectively displaying annotations located in a specified region in a program display region 300 in cooperation among functional elements of the teaching device 30 according to the eighth embodiment is achieved in a manner as follows.

A user can specify a region in the program display region 300 by a drag operation and the like. Herein, as illustrated in FIG. 20, it is assumed that a rectangular specified region 621 is specified. The specified region 621 is displayed by a frame line and the like. Such a function for accepting a user operation of specifying a region may be provided as a function of a program creation unit 131.

An annotation display/non-display setting unit 133 makes settings so as to display an annotation of an annotation command icon in the specified region 621. In this case, even when a check box 481 of annotation display in the annotation command icon is not checked (annotation non-display), the annotation display/non-display setting unit 133 displays an annotation for the annotation command icon located in the specified region 621.

In this case, as illustrated in FIG. 20, annotations 401*a* and 402*a* respectively for the annotation command icons 401 and 402 located in the specified region 621 are displayed. When specification of the specified region 621 is canceled, the annotation display/non-display setting unit 133 resets, to a state of non-display of the annotation, a display state of an annotation command icon whose annotation had not been displayed before the region was specified among annotation command icons located in the specified region 621.

With the configuration as described above, a user can collectively switch between display and non-display of an annotation in the program display region 300. The configuration described above is beneficial to a user when a plurality of annotations set to non-display are desired to be collectively temporarily checked.

Furthermore, in the present embodiment, a function of collectively making settings of annotation command icons can be achieved as follows. For example, the annotation display/non-display setting unit 133 may collectively switch setting of the check box 481 of all annotation command icons located in the specified region 621 according to setting of the check box 481 of one annotation command icon located in the specified region 621. Such a function is beneficial to a user who desires to collectively carry out setting of many annotation command icons.

Ninth Embodiment

Hereinafter, the teaching device 30 according to the ninth embodiment will be described. The teaching device 30 according to the ninth embodiment relates to a specific technique for switching setting between display and non-display of an annotation, and corresponds to a modification of a part of the function of the teaching device 30A according to the first embodiment. Thus, the teaching device 30 according to the ninth embodiment will be described below with reference to the functional block diagram (FIG. 3) in the first embodiment.

Figure 21:
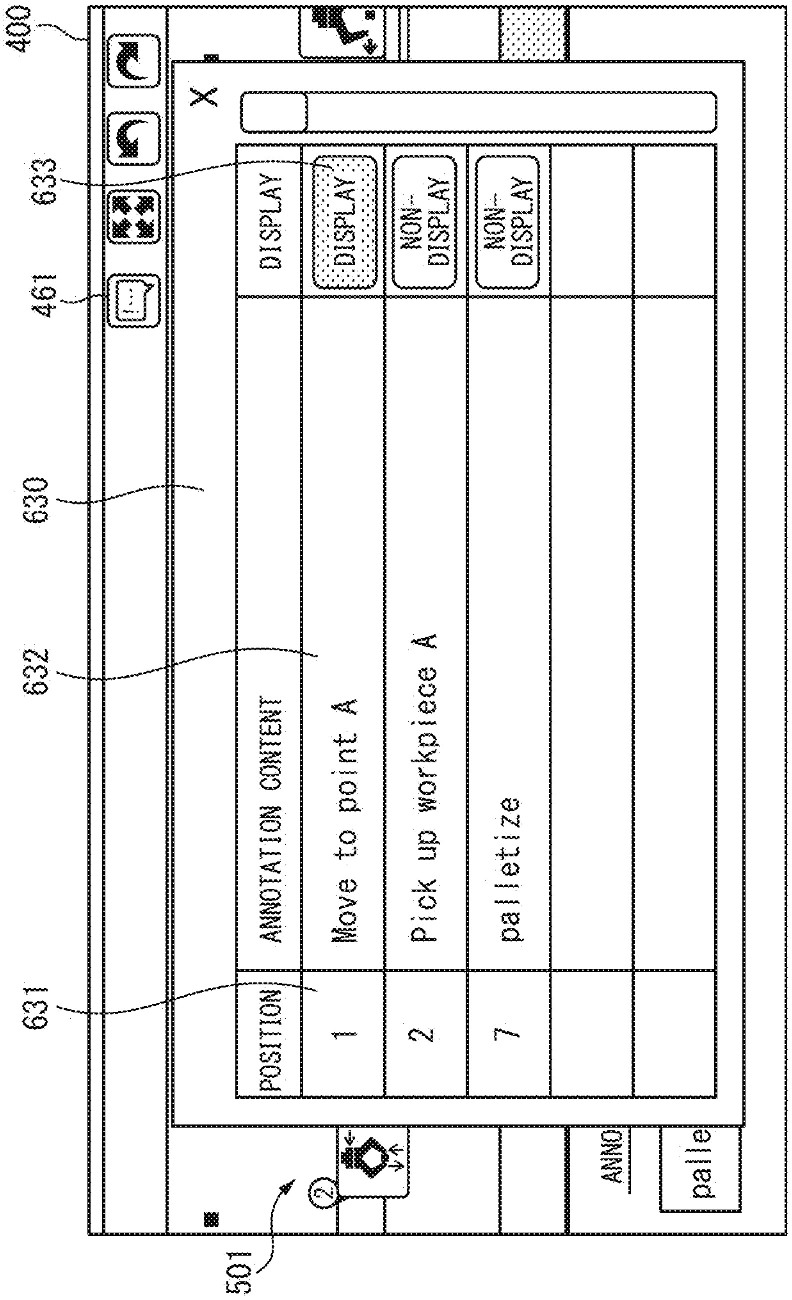
FIG. 21 is a diagram illustrating a switching function between display and non-display of an annotation by a teaching device according to a ninth embodiment.

FIG. 21 is a diagram illustrating a technique for switching setting between display and non-display of an annotation by the teaching device 30 according to the ninth embodiment.

In the present embodiment, a function for setting display and non-display of an annotation of each icon is activated in response to a predetermined operation such as, an operation of pressing an annotation display switching button 461 or an operation of pressing and holding one annotation command icon (for example, the annotation command icon 402 in FIG. 5). Herein, as an example, it is assumed that a pop-up menu 630 as illustrated in FIG. 21 is displayed. In the pop-up menu 630, a display field 631 of "position" indicates a position (row number) of an icon, and a display field 632 of "annotation content" displays an annotation set for the icon. The field of "display" displays a button 633 indicating a setting state (corresponding to a state of the check box 481 (see FIG. 5)) of display and non-display of an annotation.

The button 633 functions as a toggle button that switches setting between display and non-display every time the button 633 is pressed. A user can make setting of display and non-display of an annotation in regard to the annotation command icon by operating the button 633. The function of setting display and non-display of an annotation by activating such a pop-up menu 630 may be achieved as a function by an annotation display/non-display setting unit 133.

According to the configuration as described above, a user can easily make setting of display and non-display of an annotation for each icon. Since a list of positions and annotation contents of annotation command icons is displayed in the pop-up menu 630, convenience of the user in regard to setting of display and non-display improves.

According to each embodiment as described above, in regard to programming of an industrial machine using a teaching device, complicatedness of a display state due to a greater number of annotations can be avoided, while achieving an advantage of improving readability of a program by inputting an annotation.

In other words, according to the configuration of each embodiment, the function of adding an annotation in a more convenient form for a user who intends to use an annotation in teaching of an industrial machine can be provided.

The present invention has been described above by using the typical embodiments, but it will be understood by those of ordinary skill in the art that changes, other various changes, omission, and addition may be made in each of the embodiments described above without departing from the scope of the present invention.

The embodiment described above is the example in which a target of programming by a teaching device is a robot, but various functions described in the embodiments described above of switching between display and non-display of an annotation can be applied to a teaching device (programming device) of various industrial machines including a machine tool and the like.

The program for executing various pieces of motion for switching between display and non-display of an annotation described in the embodiments described above can be recorded in various computer-readable recording media (for example, a ROM, an EEPROM, a semiconductor memory such as a flash memory, a magnetic recording medium, and an optical disk such as a CD-ROM and a DVD-ROM).

REFERENCE SIGNS LIST

10 Robot
20 Robot controller
30, 30A, 30B, 30C, 30D, 30E, 30F Teaching device
40 PC
21, 31, 41 Processor
22, 32, 42 Memory
23, 35, 46 Input/output interface
33, 43 Display unit
24, 34, 44 Operation unit
45 Storage device
100 Robot system
131 Program creation unit
132, 132F Annotation setting unit
133, 133B, 133E, 133F Annotation display/non-display setting unit
134, 134C, 134F Annotation drawing processing unit
135, 135F Program execution unit
136, 136F Program execution state recognition unit
137, 137B, 137D, 137E, 137F Annotation display switching unit
138 Command execution determination unit
139A Program display region display unit
139B Annotation display region display unit
140 Icon selection unit
141 Icon range determination unit
200 Icon display region
300, 300F Program display region
400 Program creation screen
401, 402 Annotation command icon
403, 404 Range annotation icon
403*s* Start end position
403*e* Terminal end position
450 Setting screen
461 Annotation display switching button
471 Annotation input field
490 Annotation display region

The invention claimed is:

1. A teaching device of an industrial machine comprising a processor configured to:
generate a program creation screen for creating a program of the industrial machine;
receive setting of an annotation related to a command constituting the program;
switch between display and non-display of the set annotation on a display screen; and
receive a setting input for setting, for each command, whether to display the annotation on the display screen, wherein
the processor is further configured to switch between display and non-display of an annotation set for each command according to the setting input set for each command such that the number of annotations simultaneously displayed on the display screen is adjustable according to the setting input set for each command.

2. The teaching device according to claim 1, wherein
the command is described by an icon representing a function constituting the program.

3. The teaching device according to claim 1, wherein
the command is described as a command sentence on a text basis.

4. The teaching device according to claim 1, wherein
the processor is further configured to:
receive a user operation for switching whether to display the annotation on the display screen, and
switch between display and non-display of the annotation on the display screen according to the received user operation.

5. The teaching device according to claim 1, wherein
the processor is further configured to automatically switch between display and non-display of the annotation on the display screen according to an execution state of the program.

6. The teaching device according to claim 1, wherein
the processor is further configured to:
determine which command is executed during execution of the program, and
display an annotation set for a command determined to be currently executed.

7. The teaching device according to claim 1, wherein
the processor is further configured to switch between display and non-display of the annotation on the display screen according to whether the command is in a selected state.

8. The teaching device according to claim 1, wherein
the processor is further configured to display, on the program creation screen, an image that clearly and graphically expresses a start end position and a terminal end position of a range to which the annotation applies in the program.

9. The teaching device according to claim 1, wherein
the processor is further configured to display the annotation in a predetermined region for displaying the program in the program creation screen.

10. The teaching device according to claim 1, wherein
the processor is further configured to display the annotation in a predetermined display region of which a position is fixed on the display screen.

11. The teaching device according to claim 2, wherein
the processor is further configured to add, to each command, an icon indicating whether or not an annotation is set.

12. A teaching device of an industrial machine, comprising
a processor configured to:
generate a program creation screen for creating a program of the industrial machine;
receive setting of an annotation related to a command constituting the program;
switch between display and non-display of the set annotation on a display screen; and receive a setting input for setting, for each command, whether to display the annotation on the display screen, wherein the processor is further configured to switch between display and non-display of an annotation set for each command according to the setting input set for each command, wherein the command is described by an icon representing a function constituting the program, and the processor is further configured to accept a user operation for designating a region on the program creation screen, and collectively set whether to display annotations set for all icons in the designated region.

13. A teaching device of an industrial machine, comprising a processor configured to:

generate a program creation screen for creating a program of the industrial machine;

receive setting of an annotation related to a command constituting the program;

switch between display and non-display of the set annotation on a display screen; and receive a setting input for setting, for each command, whether to display the annotation on the display screen, wherein the processor is further configured to switch between display and non-display of an annotation set for each command according to the setting input set for each command, wherein the command is described by an icon representing a function constituting the program, and the processor is further configured, in response to a user operation, to display, on the display screen, a setting screen including a list of commands in the program, wherein the setting screen is configured to accept a setting input for setting, for each command in the list, whether to display the annotation on the display screen.

14. A teaching device of an industrial machine comprising:

a processor configured to:

generate a program creation screen for creating a program of the industrial machine;

receive setting of an annotation related to a command constituting the program; and switch between display and non-display of the set annotation on a display screen, wherein the processor is further configured to:

automatically switch between display and non-display of the annotation on the display screen according to an execution state of the program, and display the annotation during non-execution of the program, and not display the annotation during execution of the program.

15. A teaching device of an industrial machine comprising:

a processor configured to:

generate a program creation screen for creating a program of the industrial machine;

receive setting of an annotation related to a command constituting the program;

switch between display and non-display of the set annotation on a display screen; and receive a setting input for setting, for each command constituting the program, whether to permit display of an annotation during execution of the program, wherein the processor is further configured to switch between display and non-display of an annotation set for each command during execution of the program according to the setting input set for each command.

16. The teaching device according to claim 2, wherein the processor is further configured to:

receive selection of one of a plurality of the icons constituting the program;

determine whether a selected icon is a predetermined icon having a shape that clearly and graphically expresses a start end position and a terminal end position of a range to which an annotation applies in the program, or an icon located in the range between the start end position and the terminal end position of the predetermined icon, and display annotations set for the predetermined icon and the icon located in the range between the start end position and the terminal end position when it is determined that the predetermined icon or the icon located in the range between the start end position and the terminal end position is selected.

17. A teaching device of an industrial machine comprising a processor configured to:

generate a program creation screen for creating a program of the industrial machine;

receive setting of an annotation related to a command constituting the program; and switch between display and non-display of the set annotation on a display screen, wherein the command is described as a command sentence on a text basis, and the processor is further configured to display the entire program by closing a blank row caused by non-display of the annotation in the program.

* * * * *